United States Patent [19]
Schöb

[11] Patent Number: 5,708,346
[45] Date of Patent: Jan. 13, 1998

[54] METHOD AND CONTROL APPARATUS FOR CONTROLLING AN AC-MACHINE

[75] Inventor: Reto Schöb, Volketswil, Switzerland

[73] Assignees: Sulzer Electronics AG, Winterthur, Switzerland; Lust Antriebstechnik GmbH, Lahnau, Germany

[21] Appl. No.: 656,326

[22] PCT Filed: Nov. 22, 1994

[86] PCT No.: PCT/US94/13600

§ 371 Date: Jun. 11, 1996

§ 102(e) Date: Jun. 11, 1996

[87] PCT Pub. No.: WO95/18925

PCT Pub. Date: Jul. 13, 1995

[30] Foreign Application Priority Data

Jan. 10, 1994 [CH] Switzerland ............... 56/94

[51] Int. Cl.$^6$ ................ H02P 5/40; F16C 39/06
[52] U.S. Cl. ............... 318/803; 318/811; 318/805; 318/808
[58] Field of Search ............... 318/700–832, 318/867, 798; 310/166; 363/37, 160

[56] References Cited

U.S. PATENT DOCUMENTS

| | | | |
|---|---|---|---|
| 4,384,244 | 5/1983 | Matsumoto | 318/803 |
| 4,423,367 | 12/1983 | Blaschke et al. | 318/803 |
| 4,724,373 | 2/1988 | Lipo | 318/805 |
| 4,812,812 | 3/1989 | Flowerdew et al. | 340/854 |
| 4,841,204 | 6/1989 | Studer | |
| 4,885,520 | 12/1989 | Sugimoto et al. | 318/808 |
| 5,272,429 | 12/1993 | Lipo et al. | 318/808 |
| 5,280,419 | 1/1994 | Amler | 363/37 |
| 5,294,876 | 3/1994 | Jonsson | 318/803 |
| 5,334,923 | 8/1994 | Lorenz et al. | 318/805 |
| 5,488,280 | 1/1996 | Langreck | 318/805 |
| 5,510,689 | 4/1996 | Lipo et al. | 318/809 |

FOREIGN PATENT DOCUMENTS

| | | |
|---|---|---|
| 23 53 342 | 5/1978 | Germany . |
| 26 56 469 | 6/1978 | Germany . |
| 9112183 U | 3/1992 | Germany . |

Primary Examiner—Paul Ip
Attorney, Agent, or Firm—Townsend and Townsend and Crew LLP

[57] ABSTRACT

A method and apparatus for the control of an AC-machine is set forth with a special winding for the combined generation of a torque and of a transverse force in the machine. In this arrangement, the magnitude and direction of a transverse force acting on the rotor of an AC-machine is controlled via the current of a control winding of the machine. For this purpose, the magnitude and direction of a flux of the machine generated by a drive winding and also the torque-forming component of the drive current is detected. From these parameters, the desired value of the control current vector can be precisely calculated via a decoupling equation in a coordinate system which is rotating with the machine flux. Through vector rotation, through the flux angle and a constant angle, which takes into account of the position of the winding axes of the drive and control windings, the desired value of the control current vector can be transformed into the stator coordinate system of the control winding. The desired currents for the individual winding trains are determined as a result of this control current vector. These currents are impressed into the winding by a current feed apparatus.

21 Claims, 22 Drawing Sheets

METHOD AND CONTROL APPARATUS FOR CONTROLLING AN AC-MACHINE

BACKGROUND OF THE INVENTION

1. Technical Field

The invention relates to the field of drive and regulation technology.

2. Description of the Prior Art

The preconditions under which one-sided magnetic trains arise in electrical machines were already being investigated at the start of this century. There are for example described in the three-volume fundamental work by H. Sequenz "The Windings of Electrical Machines", Springer-Verlag Wien, 1950 and also in the textbook by Th. Bödefeld and H. Sequenz, sixth edition, Springer-Verlag Wien, 1962. In accordance with Sequenz, one-sided magnetic tension forces only then arise when the resulting magnetic flux polygon is centrally asymmetric and is first closed after running around the entire armature circumference. The radial Maxwell forces distributed around the entire circumference do not cancel when the vector sum is taken so that a tensile force results. Two cases are described in the fundamental work by H. Sequenz which bring about a central asymmetry of the magnetic flux polygon:

- when the rotary fields of the stator or rotor contain harmonics whose pole pair differences relative to one another or relative to the fundamental wave are equal to one,
- when, in pole-reversible rotary field machines, two windings are operated whose pole pair difference is equal to one.

For a long time one-sided magnetic trains were exclusively considered by electrical engineers as undesired disturbing forces and were counteracted by suitable measures. P. K. Hermann attempted for the first time to exploit one-sided magnetic trains acting in an electrical machine. In the German patent applications DE 24 57 084.1-32 Laying open print, 1974
DE 24 06 790.1-32 Laying open print, 1975 he describes a radial active magnetic bearing based on one-sided magnetic tensile forces. He proposes a control method in which two stator windings of an induction machine with a pole pair number difference of one is fed with three phase currents of the same frequency, with the feed current for the one winding, which is referred to in the following as the control winding, being derived by amplitude modulation from the feed current for the other winding, referred to in the following as the drive winding. The phase position between the currents of the two windings, referred to in the following as the control current and drive current, is matched by means of a phase adjusting device.

A disadvantage of this control lies in the fact that the direction and the magnitude of the magnetic tensile force controlled via the control current, referred to in the following as the Maxwell transverse force, depends on the load state and on the speed of rotation of the machine. Furthermore, with the described control, the transverse Lorentz forces which likewise occur with the combination of two winding systems with a pole pair number difference of one are not taken into account. These can therefore make themselves felt as disturbing forces.

A proposal to exploit these Lorentz transverse forces which occur with the combination of two winding systems with a pole pair number difference of one originates from J. Bichsel. In his dissertation "Contributions to the bearingless electric motor", ETH Zürich, 1990 and in the Swiss patent applications No. 04 049/90-2 patent application, 1990
No. 04 050/90-2 patent application, 1990
No. 04 051/90-0 patent application, 1990
No. 04 052/90-2 patent application, 1990 he describes magnetic bearing arrangements based on the action of the Lorentz transverse forces. He also describes a control method based on the principle of flux orientation for a synchronous machine, which makes it possible to adjust the magnitude and direction of a Lorentz transverse force independently of the operating point of the machine. A disadvantage of the control process lies in the fact that it does not take account of the Maxwell transverse forces. Moreover, the method cannot be transferred to an induction machine, since there no exploitable Lorentz transverse force can be generated.

For the realization of the control method of the invention, the magnitude of the drive flux, the angle of the drive flux and the torque-forming stator drive current in the induction machine need to be known. Methods for the determination of these parameters are described extensively in the literature under the heading "Field Orientated Regulation or Control of the Synchronous Machine and the Asynchronous Machine". The fundamental principles of the field orientated control go back to F. Blaschke (The Method of Field Orientation for the Regulation of the Asynchronous Machine, Siemens Research and Development Report No. 1/72, Siemens AG, Erlangen, 1972 and The Method of the Field Orientation for the Regulation of the Induction Machine, Dissertation TU Braunschweig, 1974). A good overview of the various methods for the field oriented regulation of the asynchronous machine is offered by the dissertation by W. Zägelin (Speed Regulation of the Asynchronous Motor Using an Observer with Low Parameter Sensitivity, Dissertation, University of Erlangen, 1984). Examples for field orientated regulation systems of synchronous machines are to be found in Orik. B.: Regelung einer permanentmagneterregten Synchronmaschine mit einem Mikrorechner (Regulation of a Permanent Magnet Excited Synchronous Machine with a Microcomputer) in the journal Automatisierungstechnik at., year 33, issue 3/85; also in Schwarz, B.: Beiträge zu reaktionsschnellen und hochgenauen Drehstrompositioniersystemen (Contributions to Fast Reaction and Highly Precise Three-phase Current Position Systems), Dissertation, University of Stuttgart, 1986; and in Löbe, W.: Digitale Drehzahl- und Lageregelung eines Synchron-Servoantriebs mit selbsteinstellender Zustandsregelung (Digital Speed of Rotation and Position Regulation of a Synchronous Servo-Drive with Self-adjusting Status Regulation) etzArchiv, volume 11, issue 4/89.

SUMMARY OF THE INVENTION

The object of the present invention is to set forth a control method and a control means for an induction machine with a $p_1$ pole-paired and a $(p_2=p_1\pm1)$ pole-paired winding for the formation of a transverse force vector acting on the rotor of the machine, wherein the above-named disadvantages of the prior art are avoided. In particular, the control process should take account of both of the transverse forces arising in the machine: the Maxwell transverse force and the Lorentz transverse force. The control process should moreover permit the exact control of the transverse force vector for each operating state of the machine.

The method is based on the analysis of both of the magnetic transverse forces: the Maxwell transverse force and the Lorentz transverse force, acting in an electrical induction machine.

Maxwell forces are forces which arise in a magnetic circuit at the boundary surfaces between materials of different permeabilities. In a machine with a ferro-magnetic rotor, the Maxwell forces act perpendicularly to the rotor. Since the sum of these forces cancel with a precisely centered arrangement of the rotor and with a sinusoidal distribution of the induction, no attention is normally paid to them at all. It is only when a displacement of the rotor away from the center or an asymmetrical induction distribution arises that a Maxwell transverse force results. A symmetry of the induction distribution of this kind can be achieved when a ($p_2=p_1\pm1$) pole-paired likewise sinusoidally distributed magnetic control field is superimposed on the $p_1$ pole-paired sinusoidally distributed magnetic drive field (see FIG. 1). The two magnetic fields can be described by flux vectors. $\Phi_1$ points in direction of the maximum induction of the magnetic drive field and $\Phi_2$ points in the direction of the maximum induction of the magnetic control field. The magnitude of the Maxwell transverse force is proportional to the product of the flux sizes. If the vectors are considered in their electrical planes ($\Phi_1$ in the $p_1$ pole-paired system and $\Phi_2$ in the $p_2$ pole-paired system), then the direction of the Maxwell transverse force is only dependent on the relative position of the two flux vectors to one another. For the case of $p_2=p_1\pm1$, the Maxwell transverse force vector points in the direction of the control flux vector $\Phi_2$ relative to the drive flux vector $\Phi_1$ (see FIG. 3). For the case $p_2=p_1-1$ the Maxwell transverse force vector must additionally be reflected at the 1- axis.(see FIG. 2).

The control flux is proportional to the magnetization current in the control winding (magnetization current contribution of the control current). If it can be assumed that no $p_2$-pole-paired rotor current is flowing, then this is practically identical with the control current. Thus the transverse force can be directly set via the control current vector $i_{S2}^{(S,p2)}$. The Maxwell transverse force can thus be described as a vector equation of $i_{S2}^{(S,p2)}$ and $\Phi_1$. In the practical handling of the equation it is simpler if the flux vector $\psi_{1q}^{(p1)}$ which is linked with the $p_1$ pole-paired drive winding is used in place of the drive flux vector $\Phi_1$.

The Maxwell transverse force is thus illustrated in vector components by the following equation.

$$F_{Mx}=+\frac{\pi p_1 p_2 L_2}{4l r \mu_0 w_1 w_2} (i_{S2d}^{(p2)}\cdot\psi_{1d}^{(p1)}+i_{S2q}^{(p2)}\cdot\psi_{1q}^{(p1)})$$

$$F_{My}=\pm\frac{\pi p_1 p_2 L_2}{4l r \mu_0 w_1 w_2} (i_{S2q}^{(p2)}\cdot\psi_{1d}^{(p1)}-i_{S2d}^{(p2)}\cdot\psi_{1q}^{(p1)}) |_{p_2=p_1\pm1}$$

The selected vector component representation is based on the known and widely used vector illustration of the electrical machine (two-axes representation, dq-representation). With this type of representation, an m-phased machine with the pole pair number p is shown for the sake of simpler description by means of planar vectors on a two-phased substitute machine with the pole pair number 1. Since however two windings with a pole pair difference of 1 are necessary for the transverse force formation in an induction machine, and the geometrical current and flux distributions in the machine are of interest in contrast to the description of the torque formation, it is of importance for the description of the transverse force formation that the information concerning the geometrical winding distribution which is lost when representing the real machine on the substitute machine is replaced by a characterization of the plane of the representation and the definition of the position of the winding axes. Accordingly, the plane of the illustration is set out for all vector parameters (upper indices in brackets) in the following equations. The geometrical position of the windings is so defined that their d-axes coincide with the geometrical x-axis. The characterization of the phase numbers of the windings is not necessary because these do not have any influence on the geometrical current and flux distribution in the machine.

Now it is known from the prior art that Lorentz transverse forces can likewise be generated in an induction machine. Lorentz forces are forces which act on a conductor through which current is flowing in a magnetic field. With a sinusoidal current and sinusoidal induction distribution in the machine, these forces act radially on the rotor and bring about a torque. Through a combination of a $p_1$ pole-paired induction distribution and a ($p_2=p_1\pm1$) pole-paired current distribution, it is now possible to generate a Lorentz transverse force (see FIG. 4). Analogously to the Maxwell transverse force, the Lorentz transverse force can be described by vectors. These are the current vector I and the flux vector $\Phi$. The magnitude of the Lorentz transverse force is proportional to the product of the current and flux magnitudes. If the vectors are considered in their electrical planes, then the direction of the Lorentz transverse force is likewise dependent only on the relative position of the two vectors to one another. For the case $p_2=p_1+1$, the Lorentz transverse force vector points directly in the direction of the current vector relative to the flux vector (see FIG. 6). For the case $p_2=p_1-1$, the Lorentz transverse force vector must additionally be reflected at the 2-axis (see FIG. 5).

Analogously to the Maxwell transverse force, a Lorentz transverse force can thus be generated in the induction machine and depends on a drive flux and the control current. This is designated in the following as the useful Lorentz force and is defined by the following vector component equation:

$$F_{Lx}=\pm\frac{m p_1 w_2}{2 r w_1} (i_{S2d}^{(p2)}\cdot\psi_{1d}^{(p1)}+i_{S2q}^{(p2)}\cdot\psi_{1q}^{(p1)})$$

$$F_{Ly}=+\frac{m p_1 w_2}{2 r w_1} (i_{S2d}^{(p2)}\cdot\psi_{1q}^{(p1)}-i_{S2q}^{(p2)}\cdot\psi_{1d}^{(p1)}) |_{p_2=p_1\pm1}$$

The prior art proposals of Bichsel for the generation of transverse force in the electrical machine are based on the exploitation of this useful Lorentz force. As, however, the control current in the control winding always also causes a control flux, the useful Lorentz force is always accompanied by a Lorentz transverse force which results from the control flux and the drive current. It is called a disturbing Lorentz force in the following because it weakens the desired useful Lorentz force depending on the type of construction of the machine and likewise contains uncontrollable components which are dependent on the torque-forming drive current. The disturbing Lorentz force is determined in accordance with the equation $$F_{Sx}=\mp\frac{m p_1 w_1}{2 r w_2} (i_{S1d}^{(p1)}\cdot\psi_{2d}^{(p2)}+i_{S1q}^{(p1)}\cdot\psi_{2q}^{(p2)})$$

$$F_{Sy}=-\frac{m p_1 w_1}{2 r w_2} (i_{S1q}^{(p1)}\cdot\psi_{2d}^{(p2)}-i_{S1d}^{(p1)}\cdot\psi_{2q}^{(p2)}) |_{p_2=p_1\pm1}$$

The above equations apply to any desired machine coordinate system. If now the above transverse force equations are represented in a coordinate system (F) which rotates with the argument of the drive flux vector $\psi_1^{(p1)}$ measured in the $p_1$ plane, then the transverse components of the drive flux $\psi_{1q}^{(p1)}$ and thus the second term in the useful force equations disappears. In the case of the asynchronous machine, the first term of the Lorentz useful force equation and of the Lorentz disturbing force equation moreover cancel. In the case of the self-guided synchronous machine, the d-component of the stator current is $i_{S1d}$ disappears. The transverse force equation thus reads in the coordinate system (F):

$$F_x = K_{Fx} \cdot i_{S2d}^{(F,p2)} \cdot \psi_1 - K_{Sx} L_2 \cdot i_{S2q}^{(F,p2)} \cdot i_{S1q}^{(Fp1)}$$

$$F_y = K_{Fy} \cdot i_{S2q}^{(F,p2)} \cdot \psi_1 - K_{Sy} L_2 \cdot i_{S2d}^{(F,p2)} \cdot i_{S1q}^{(Fp1)}$$

or $$\underline{F}_x = i_{S2}^{(F,p2)} \cdot \underline{K}_F \cdot \Psi_1 - \begin{bmatrix} 0 & 1 \\ 1 & 0 \end{bmatrix} \cdot i_{S2}^{(F,p2)} \cdot \underline{K}_S \cdot L_2 \cdot i_{S1q}^{(F,p1)}$$

The useful force constants $K_{Fx}$, $K_{Fy}$ and the disturbing force constants $K_{Sx}$, $K_{Sy}$ are differently defined depending on the winding combination ($p_2 = p_1 + 1$ or $p_2 = p_1 - 1$) and the machine type (synchronous machine or asynchronous machine). With the Maxwell force constant $$K_M = \frac{\pi p_1 p_2 L_2}{4 l r \mu_0 w_1 w_2},$$

the Lorentz disturbing force constant $$K_S = \frac{m p_2 w_1}{2 r w_2}$$

and the Lorentz useful force constant $K_L$ becoming $$K_L = \frac{m p_1 w_2}{2 r w_1}$$

for the synchronous machine and $K_L = 0$ for the asynchronous machine, there applies for the case $p_2 = p_1 + 1$:

$$K_{Fx} = K_{Fy} = K_m + K_L \text{ and } K_{Sx} = K_{Sy} = K_S$$

and for the case $p_2 = p_1 - 1$:

$$K_{Fx} = K_M - K_L, \; K_{Fx} = -K_M + K_l \text{ and } K_{Sx} = -K_S, \; K_{Sy} = K_S.$$

As the above vector equations show, the representation of the transverse forces which act in the machine as a whole in coordinate system (F) is very simple.

The core of the controlled method of the invention is thus that the determination of the control current vector in just this coordinate system (F) takes place in the $p_2$-plane and is subsequently transformed into the stator coordinate system by a coordinate transformation.

A mutual rotation of the two winding systems relative to one another through the angle $\alpha_{1,2}$ and relative to the geometrical x-axis by the angle $\alpha_0$ can be taken into account by an additional rotation of the control current vector through the angle $$\rho_0^{(P02)} = \alpha_0 + \frac{p_2}{p_1} \alpha_{1,2}.$$

The determination of the control current vector in the $p_2$ plane then takes place in a coordinate system (T) which rotates with the angle $\rho^{(p2)} = \rho_0^{(p2)} + \gamma_S^{(p1)}$.

If the drive flux is kept constant in the above equation, then the useful component of the transverse force is directed proportional to the control current. Since the disturbing force is generally small, and if no torque is built up in the machine, the desired current control vector can be determined in this case by a simple multiplication of the desired force vector with a constant. A change of the flux magnitude can be taken into account by parameter adaption.

The idea of determining the desired control current vector via a decoupling equation also corresponds to a further concept of the invention.

Resolved in accordance with the control current the force component equations read:

$$i_{S2d}^{*(F,p2)} = \frac{F^*_x K_{Fy} \Psi_1 + F^*_y K_{Sx} L_2 i_{S1q}^{(F,p1)}}{K_{Fx} K_{Fy} \Psi_1^2 - K_{Sx} K_{Sy} L_2^2 i_{S1q}^{(F,p1)2}},$$

$$i_{S2q}^{*(F,p2)} = \frac{F^*_y K_{Fx} \Psi_1 + F^*_x K_{Sy} L_2 i_{S1q}^{(F,p1)}}{K_{Fx} K_{Fy} \Psi_1^2 - K_{Sx} K_{Sy} L_2^2 i_{S1q}^{(F,p1)2}}$$

(The desired values are marked in the equations with an *. As a result of the desired force vector $$\underline{F}^* = \begin{pmatrix} F^*_x \\ F^*_y \end{pmatrix}$$

and by means of knowledge of the machine parameters $i_{S1q}^{(F,p1)}$ and $\psi_1$ considered in the $p_1$ plane in flux coordinates of the drive flux $\psi_1^{(p1)}$, the desired control current vector $i_{S2}^{*(F,p2)}$ can be continuously computed in the flux coordinates of the $p_2$-plane. A mutual rotation of the two winding systems to one another by the angle $\alpha_{1,2}$ and relative to the geometrical x-axis by the angle $\alpha_0$ can, as said, be taken into account by an additional rotation of the control current vector through the angle $$\rho_0^{(p2)} = \alpha_0 + \frac{p_2}{p_1} \alpha_{1,2}$$

The current relation of the desired control current vector in the $p_2$ plane then takes place in a coordinate system (T) rotating with the angle $\rho^{(p2)} = \rho_0^{(p2)} + \gamma_0^{(p1)}$ in accordance with the following decoupling equation:

$$i_{S2d}^{*(T,p2)} = \frac{F^*_x K_{Fy} \Psi_1 + F^*_y K_{Sx} L_2 i_{S1q}^{(F,p1)}}{K_{Fx} K_{Fy} \Psi_1^2 - K_{Sx} K_{Sy} L_2^2 i_{S1q}^{(F,p1)2}},$$

$$i_{S2q}^{*(T,p2)} = \frac{F^*_y K_{Fx} \Psi_1 + F^*_x K_{Sy} L_2 i_{S1q}^{(F,p1)}}{K_{Fx} K_{Fy} \Psi_1^2 - K_{Sx} K_{Sy} L_2^2 i_{S1q}^{(F,p1)2}}$$

The desired control current vector computed in the coordinate system (T) can be transformed by rotation through $\rho^{(p2)}$ into the stator coordinate system of the $p_2$ pole-paired winding:

$$i_{S2}^{*(S,p2)} = D(\rho) \cdot i_{S2}^{*(T,p2)}$$

The so-obtained desired control current vector $i_{S2}^{*(S,p2)}$ used as the desired value vector of a current feeding apparatus which feeds the control winding with the control current $i_{S2}^{(S,p2)}$.

A preferred embodiment is characterized in that the speed of rotation and of the torque of the machine is controlled or regulated, as in a conventional induction machine, via the drive winding by means of a generally known desired control regulating process such as for example a characteristic control or a field orientated control. The machine parameters $i_{S1q}^{(F,p1)}$ and $\psi_1$ and also the argument of the drive flux vector $\psi_1^{(p1)}$, $\gamma_0^{(p1)}$ resulting from this control of the drive winding are continuously determined by direct measurement, by computation from simply measurable machine parameters such as for example the stator voltages, stator currents, speed of rotation of the rotor, angle of rotation of the rotor via the machine equations or by means of a state observer and also by computation of measurement parameters and desired drive values. With the aid of these, as a result of the desired values of the transverse force, the computation of the control current vector $i_{s2}^{*(T,p2)}$ takes place via the above defined decoupling equations in a coordinate system (T) rotating with the angle $\gamma_s^{(p1)}$ and turned through the constant angle $\rho_0^{(p2)}$. This control current vector $i_{s2}^{*(T,p2)}$ is continuously transformed by a rotary transformation through the angle $\rho^{(p2)} = \rho_0^{(p2)} + \gamma_s^{(p1)}$ in stator coordinates and the so resulting control current vector $i_{s2}^{*(S,p2)}$ is used as the desired current value for a current feed apparatus which feeds the control winding with the control current $i_{s2}^{(S,p2)}$.

The core of the control apparatus of the invention is to be seen in the fact that in the control apparatus, first means are present which determine the magnitude and phase of the drive flux and also the torque-forming component of the drive winding current from measurement parameters and/or desired values of the drive, and in that second means determine a desired value of the control current vector $i_{s2}^{*(S,p2)}$ on the basis of these parameters and a desired transverse force vector by means of the control method of the invention. Fourth means are provided in order to calculate from the desired value of the control current vector $i_{s2}^{*(S,p2)}$ the desired values of the $m_2$ phase currents of the control winding by 2 to $m_2$ phase transformation. Fifth means are provided which, as a result of the desired phase current values, feed the $m_2$ trains of the control winding with currents. Moreover, third means are provided which feed the drive winding in accordance with any desired control or regulating method and ensure that a minimum drive flux is present in all operating states in which a transverse force is to act on the rotor.

The advantage of the method or control apparatus of the invention lies as a whole in the fact that the transverse force acting on the rotor of the induction machine can be set more accurately than in the prior art and in any drive-side operating state of the machine, in particular also when the rotor is stationary and in the weak-field region, since the drive-side operating state of the machine is detected and both the Lorentz transverse forces and also the Maxwell transverse forces acting in the machine are taken into account by the control method.

DETAILED DESCRIPTION OF THE PREFERRED EXEMPLARY EMBODIMENTS

Figure 1A:
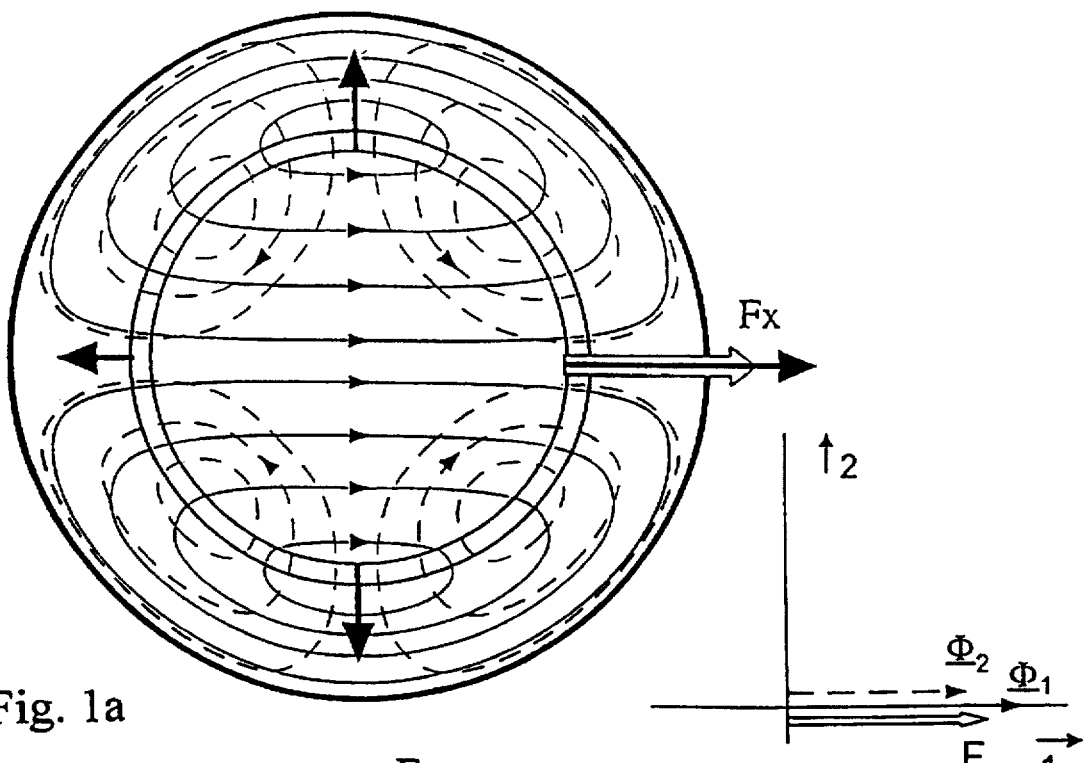
FIGS. 1a and 1b illustrate a Maxwell transverse force acting on the rotor that can be generated in an induction machine by superimposing a magnetic drive field with the pole pair number $p_1$ on a control field with the pole pair number $p_2 = p_1 \pm 1$ and that can point in any desired direction depending on the mutual position of the fields. This circumstance is illustrated here qualitatively for the case $p_1 = 1$ and $p_2 = 2$. The control field with the pole pair number 2 weakens the drive field with the pole pair number 1 in certain regions and enhances it on the other side. The Maxwell transverse force is generated by this asymmetry. It always points here in the direction of the control flux vector $\Phi_2$ considered in the $p_2$ plane relative to the drive flux vector $\Phi_1$ considered in the $p_1$ plane. At the top both the drive flux vector and also the control flux vector point geometrically and electrically into the 1-direction, whereby the Maxwell transverse force also points in the 1-direction. At the bottom the drive flux vector again points in the 1-direction. The control flux vector, however, now points geometrically 45° upwardly and electrically in the 2-pole pair plane and thus in the 2-direction, whereby the Maxwell transverse force also points in the 2-direction.
Figure 1B:
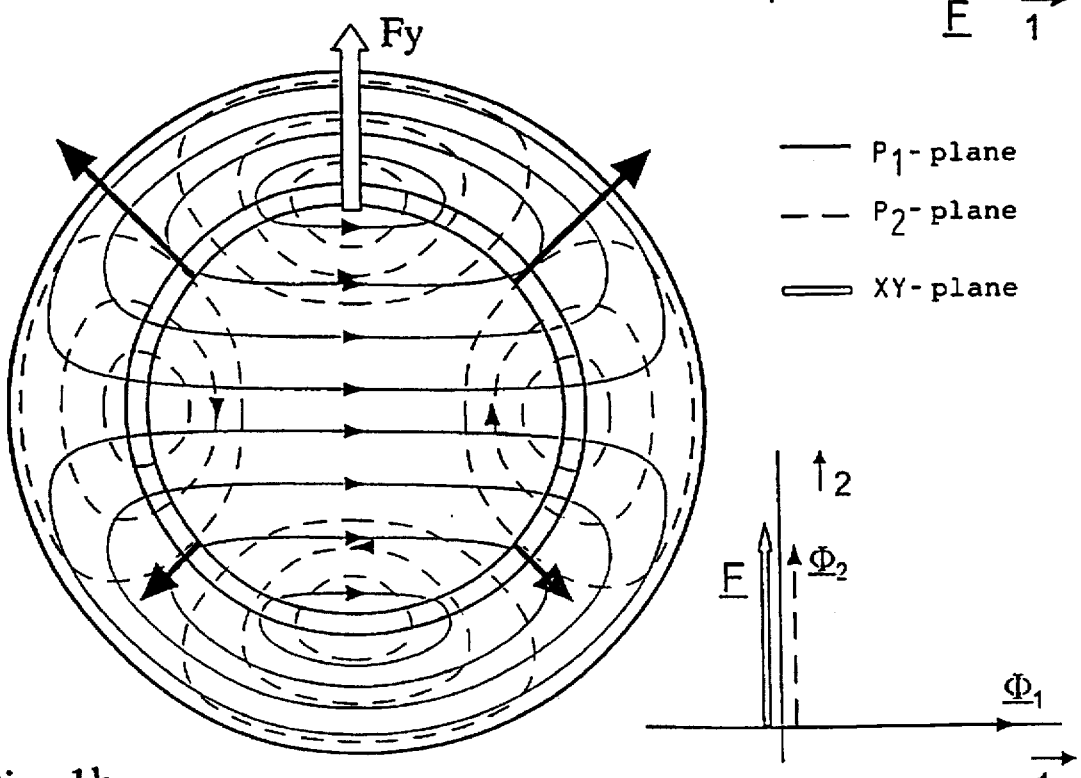
Figure 2:
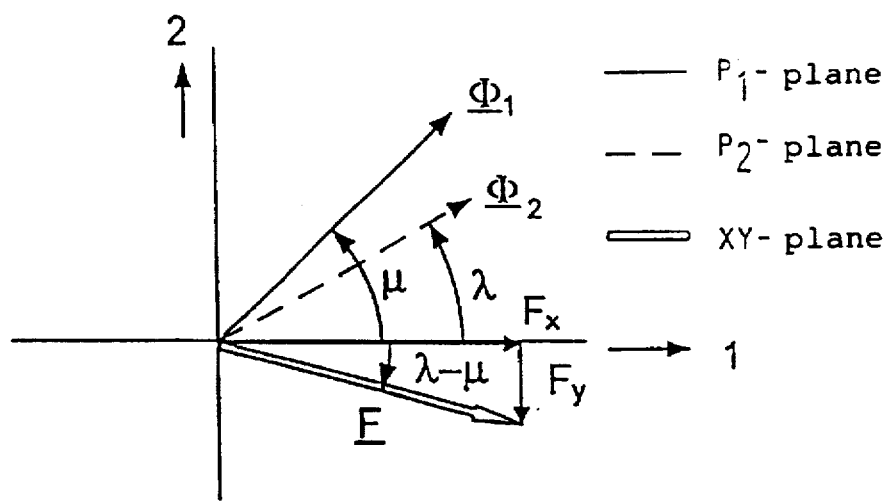
FIG. 2 illustrates for the general case $p_2 = p_1 - 1$ that the transverse Maxwell force always points into the direction of the control flux vector $\Phi_2$ considered in the $p_2$ plane as reflected in the one axis relative to the drive flux vector $\Phi_1$ considered in the $p_1$ plane.
Figure 3:
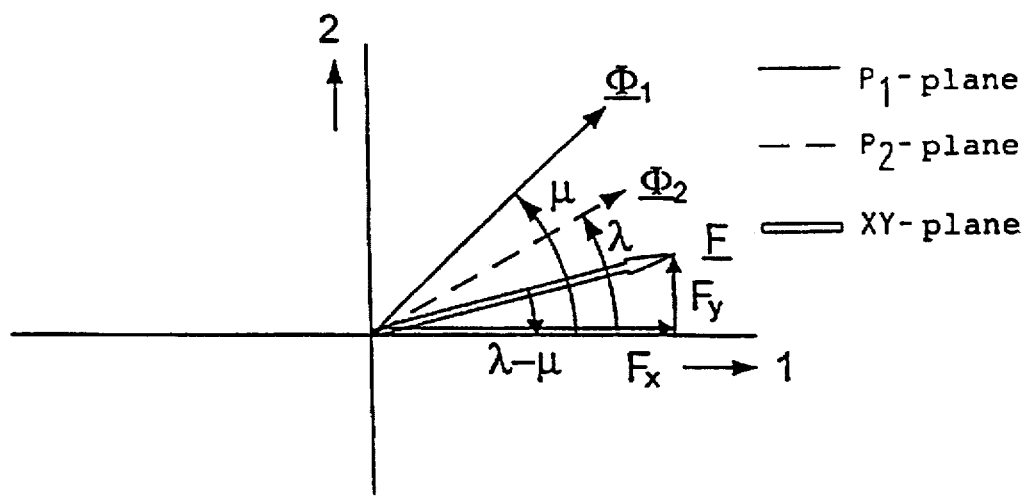
FIG. 3 illustrates for the general case $p_2 = p_1 + 1$ that the Maxwell transverse force always points in the direction of the control flux vector $\Phi_2$ considered in the $p_2$ plane relative to the drive flux vector $\Phi_1$ considered in the in the $p_1$ plane.
Figure 4A:
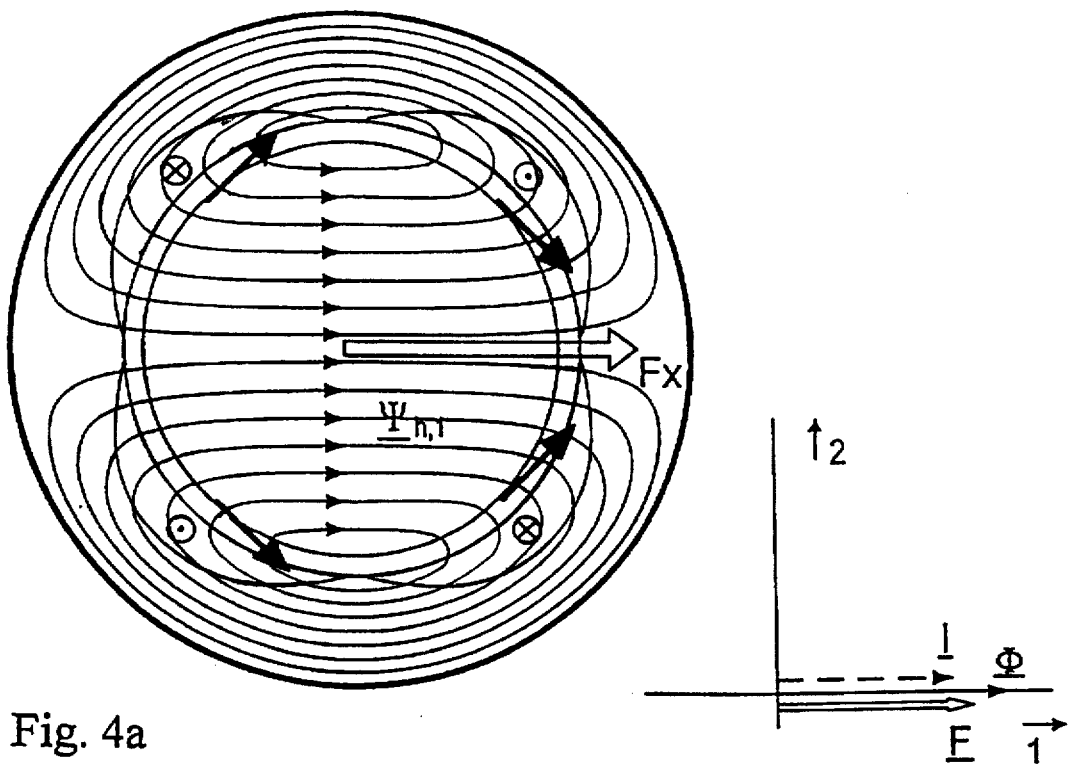
FIGS. 4a and 4b illustrate a Lorentz transverse force acting on the rotor that can be generated in an induction machine by position of a magnetic field with the pole pair number $p_1$ on a current distribution of the pole pair number $p_2 = p_1 \pm 1$ and that can point in any desired direction depending on the mutual position of the fields. This circumstance is illustrated here qualitatively for the case $p_1 = 1$ and $p_2 = 2$. The current distribution with the pole pair number 2 brings about, in the magnetic field with the pole pair number 1, Lorentz forces acting radially on the rotor which result in sum in a transverse Lorentz force. It always points in the direction of the current vector I considered in the $p_2$ plane relative to the flux vector $\Phi$ considered in the $p_1$ plane. At the top both the flux vector $\Phi$ and also the current vector point geometrically and also electrically in the 1-direction, with the Lorentz transverse force also pointing in the 1-direction. At the bottom the flux vector again points in the 1-direction. The current vector now points however geometrically upwardly by 45° and electrically in the 2-pole pair plane, and thus in the 2-direction, so that the Lorentz transverse force also points in the 2-direction.
Figure 4B:
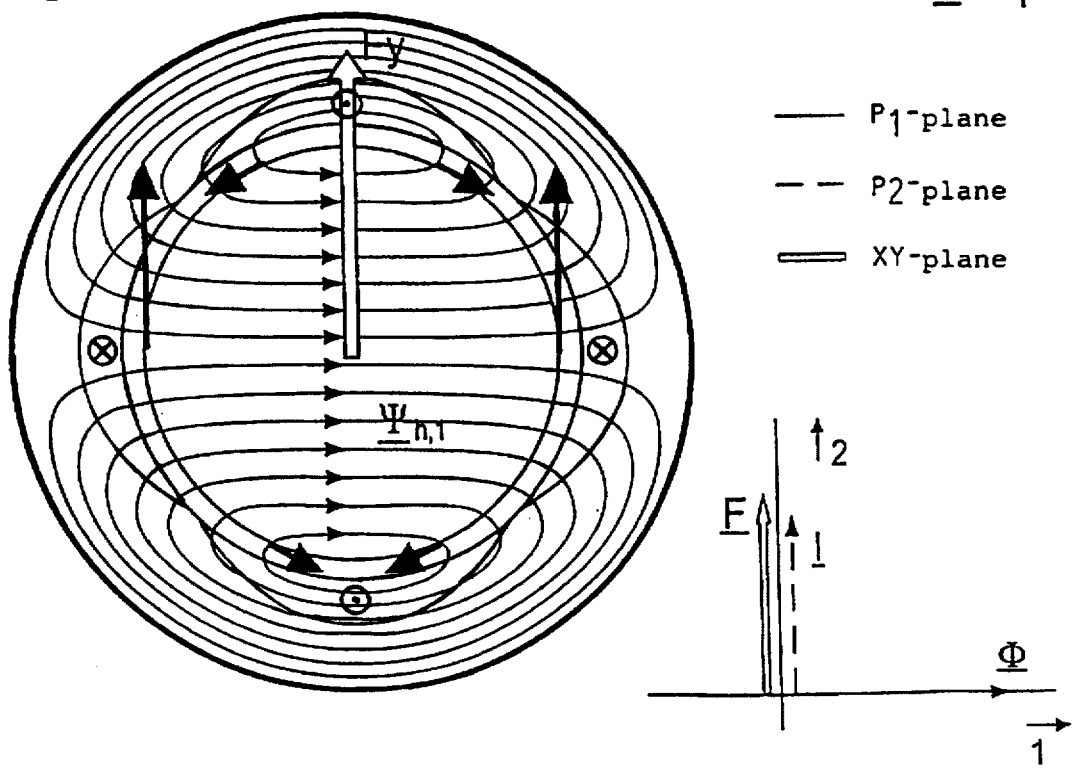
Figure 5:
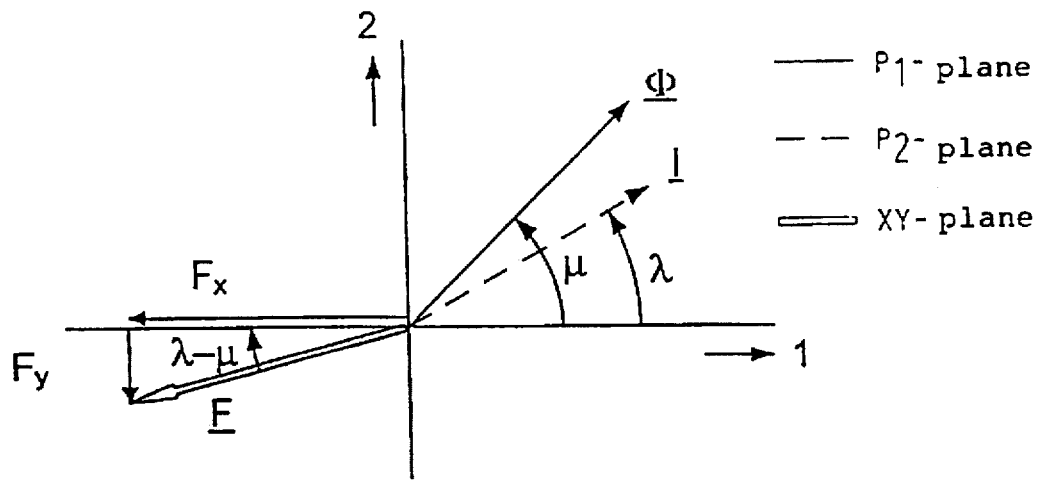
FIG. 5 illustrates for the general case $p_2 = p_1 - 1$ that the transverse Lorentz force always points in the direction of the current vector I considered in the $p_2$-plane as reflected at the 2-axis relative to the flux vector $\Phi$ considered in the $p_1$-plane.
Figure 6:
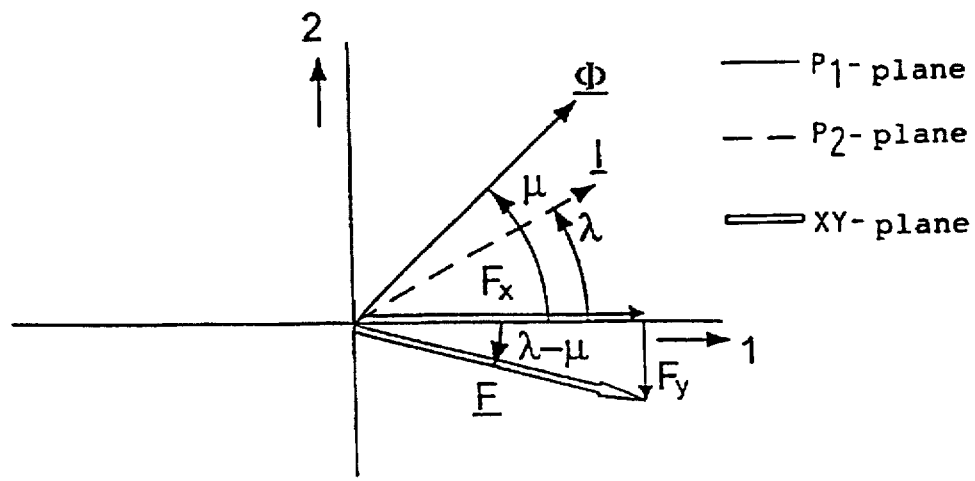
FIG. 6 illustrates for the general case $p_2 = p_1 + 1$ that the transverse Lorentz force always points in the direction of the current vector I considered in the $p_2$ plane relative to the flux vector $\Phi$ considered in the $p_1$ plane.
Figure 7:
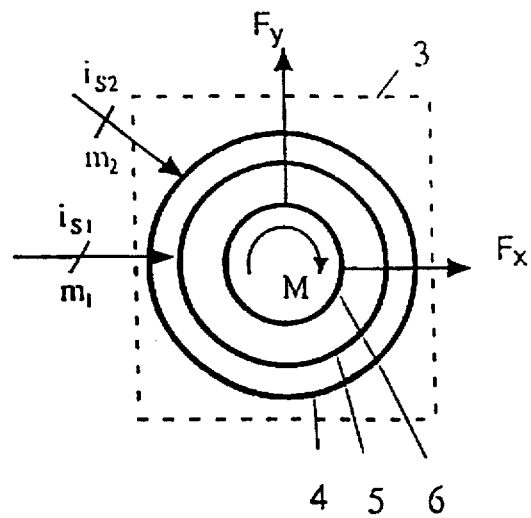
FIG. 7 shows the equivalent circuit diagram of an induction machine with a $p_1$ pole pair drive winding and a $p_2 = p_1 \pm 1$ pole-paired control winding.

It has been known for a long time (for example from H. Sequenz "The Windings of Electrical Machines" Springer Verlag Wien, 1950) that transverse forces acting on the rotor can be generated in an induction machine by two combined windings with the pole pair numbers p and p±1. An AC-machine, such as an induction machine, of this kind can be illustrated by the symbol in FIG. 7. The drive winding (4) with the pole pair number $p_1$, the control winding (5) with the pole pair number $p_2 = p_1 \pm 1$, and the rotor (6) of the induction machine (3) are symbolized by concentric circles. The signal flux plan of such an induction machine with drive and control winding is illustrated for the case of the asynchronous machine in FIG. 9 and for the case of the synchronous machine in FIG. 10. The block which is of interest here responsible for the transverse force formation is the same for both machine types.

A control method in accordance with a first reference (Hermann) is based on a machine model which takes account only of the Maxwell forces and considers the induction machine only in steady-state operation. The drive winding is connected to a rigid three-phase current supply. For the control of the transverse force vector, the phase currents ($i_{S2}$) of the control winding are derived from the drive currents ($i_{S1}$) by Hermann by means of amplitude modulation. Via a phase adjustment, the phase between the drive currents and the control currents is fixedly set for a fixed working point. With this fixed working point, the contribution of the machine flux $\psi_1$ is constant and the flux angle $\gamma^{S(p1)}$ rigidly associated with the phase of the drive currents. The cross coupling taken into account in FIGS. 9 and 10 between the control current components ($i_{S2d}^{(T,p2)}$, $i_{S1q}^{(F,p1)}$) and the transverse force components ($F_x$, $F_y$) which arises as a result of the Lorentz forces, is proportional to the torque-forming drive current component $i_{S1q}^{(F,p1)}$ and relatively weak. For a fixed working point, the transverse force acting on the rotor is controllable in accordance with a control process as in Hermann. A control of the transverse forces is however not possible with this process with a dynamic operation of the rotary field machine (load change, change in the speed of rotation).

The control method in accordance with the second reference (Bichsel) is based on a machine model which only takes account of the Lorentz forces. A precise control of the transverse force is not possible with this method, since in general the Maxwell transverse forces which are not taken into account are much larger than the Lorentz transverse forces.

Figure 8:
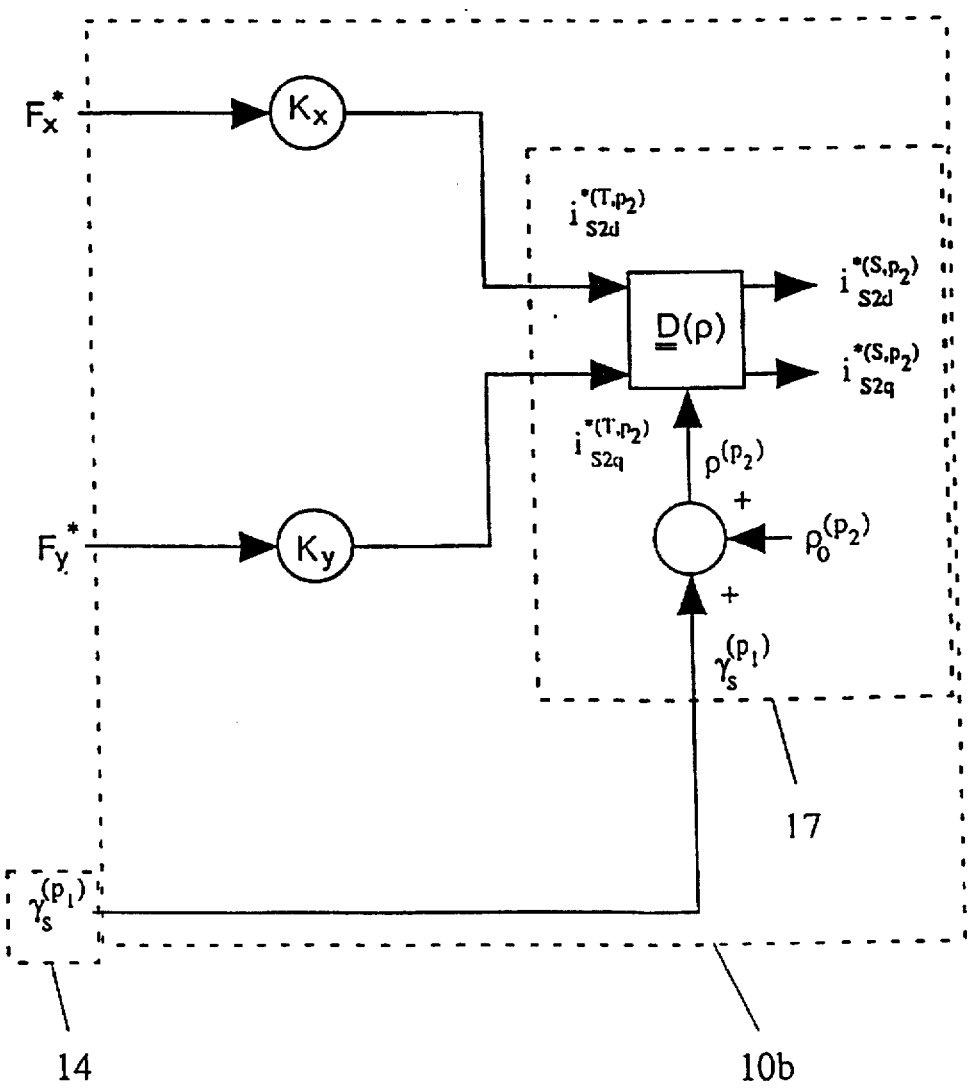
FIG. 8 schematically illustrates the signal control method of the present invention.
Figure 9:
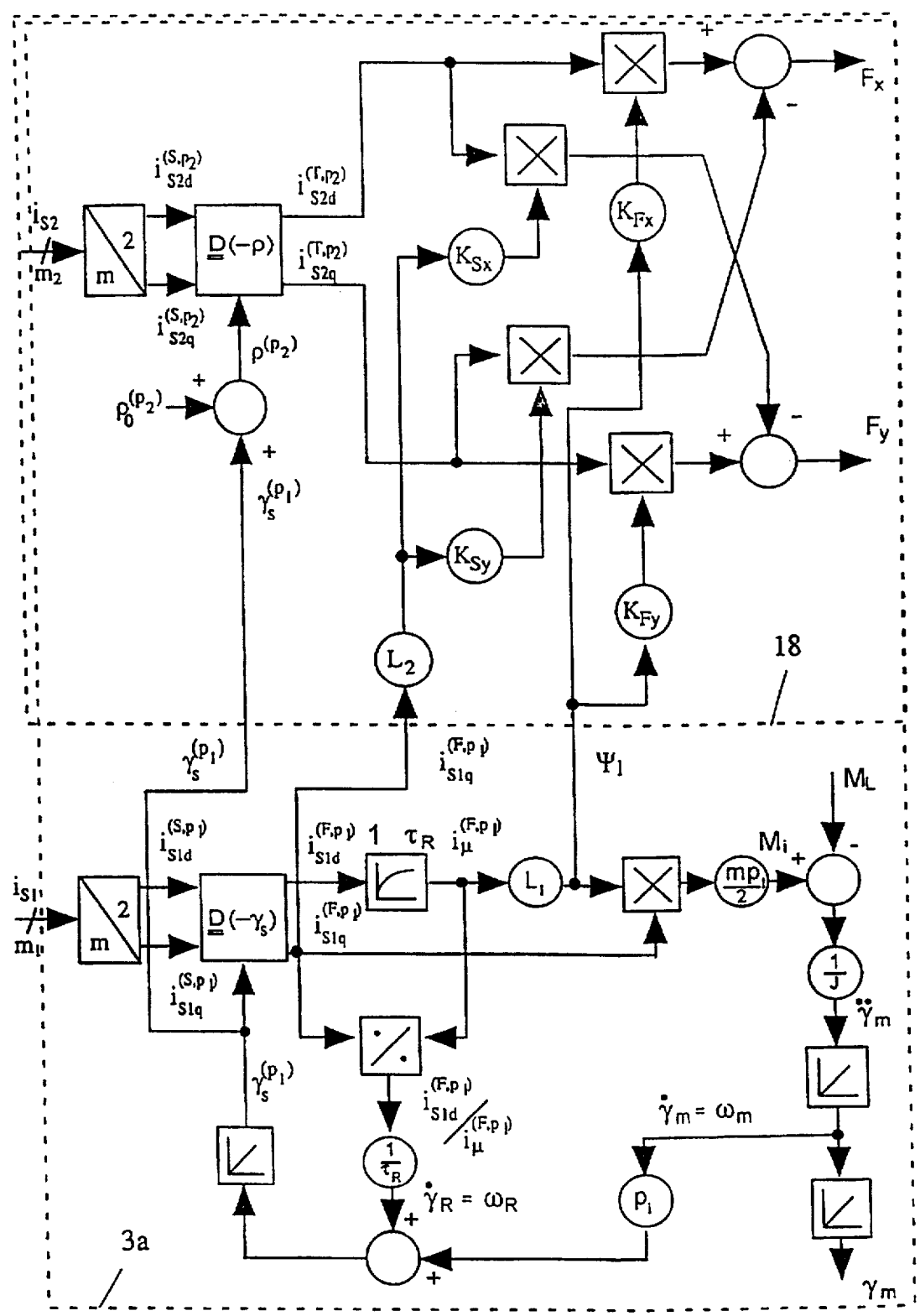
FIG. 9 illustrates a signal flux plan for an asynchronous machine with a $p_1$ pole-paired drive winding and a $p_2 = p_1 \pm 1$ pole-paired control winding in accordance with FIG. 7 showing the vector components.
Figure 10:
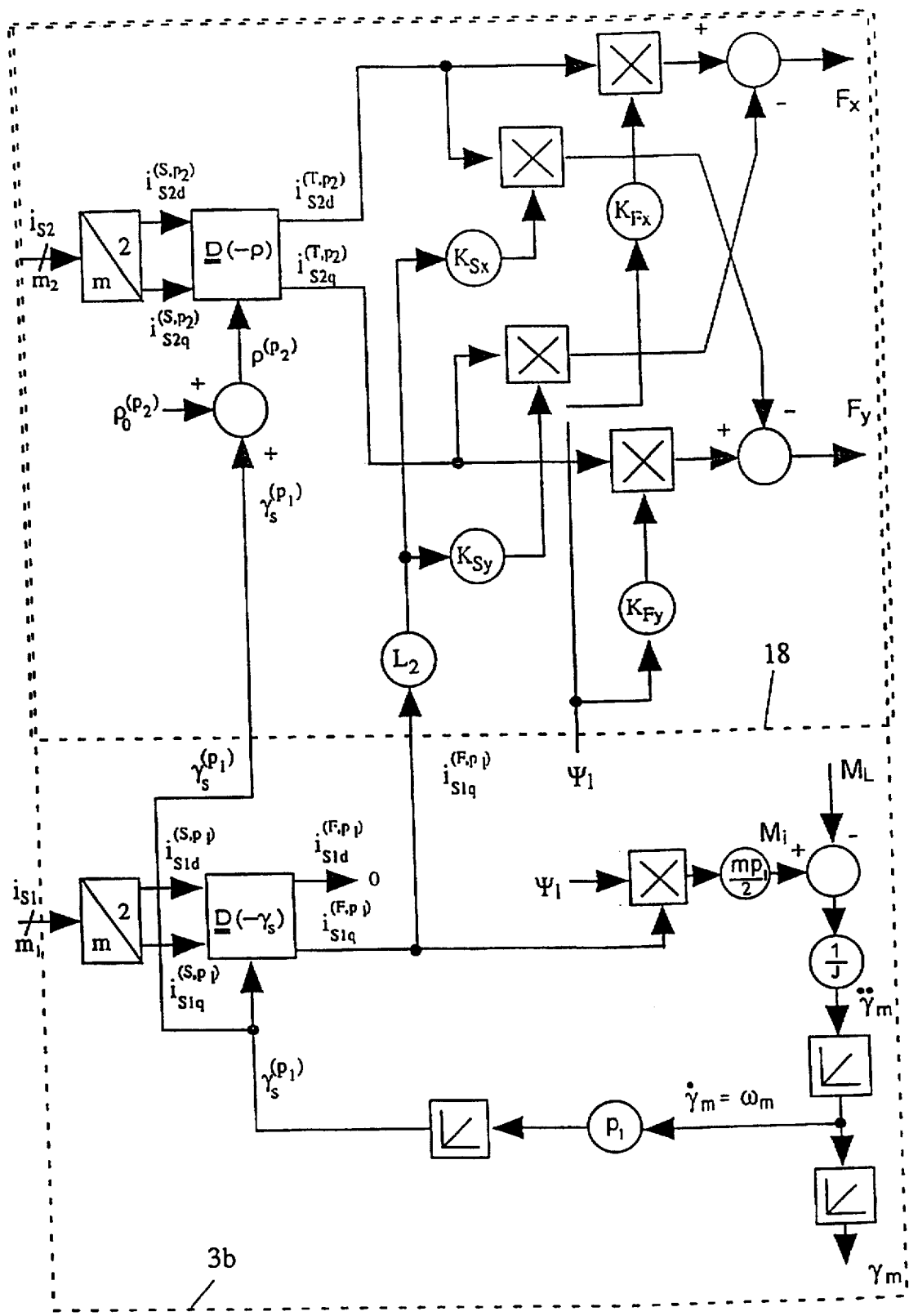
FIG. 10 illustrates a signal flux plan of a synchronous machine with a $p_1$ pole-paired drive winding and a $p_2 = p_1 \pm 1$ pole-paired control winding in accordance with FIG. 7 showing the vector components.

In accordance with the invention a control method is now proposed which is based on the model of the transverse force formation (18) shown in FIGS. 9 and 10, which takes account of both the Maxwell transverse forces and also the Lorentz transverse forces, as well as any desired operating states of the machine (not in the steady-state operating case). The core of this control method is illustrated in FIG. 8. In a first step, the control current necessary for a desired force action and which is illustrated in the figure by the vector components $i_{S2d}^{*(T,p2)}$ and $i_{S2q}^{*(T,p2)}$ is determined in a coordinate system (T) which rotates with the flux vector and which has additionally been rotated by a fixed angle. In the second step the so-calculated desired control current vector is transformed by rotation through the angle $\rho^{(p2)}$ into the stator coordinate system (17). The transformation angle $\rho^{(p2)} = \rho_0^{(p2)} + \gamma_S^{(p1)}$ is continuously formed from the argument of the flux vector $\gamma_S^{(p1)}$ measured in the $p_1$-plane in the stator coordinate system and a fixed angle of rotation $\rho_0^{(p2)}$ which takes account of the mutual rotation of the two winding systems relative to one another and relative to the geometrical x-axis. The constant component of the angle of rotation $\rho_0^{(p2)}$ is defined by the relationship $$\rho_0^{(p2)} = \alpha_0 + \frac{p_2}{p_1} \alpha_{1,2}$$

with $\alpha_0$ corresponding to any mutual rotation, that may be present, of the d-axis of the drive winding relative to the x-axis of the geometrical coordinate system, and with $\alpha_{1,2}$ corresponding to any mutual rotation of the d-axes of the drive and control windings relative to one another.

The determination of the control current in the coordinate system (T) as a result of the desired transverse force can be conceived in many different manners. In the simplest case, when the Lorentz disturbing forces are small and when the flux magnitude is kept constant, the control current is directly proportional to the desired transverse force and can thus be obtained from this by multiplication with a constant value. This simplest case is also shown in FIG. 8. For a winding with $p_2 = p_1 + 1$ the two constants $F_x$ and $F_y$ have a positive sign and the same value. For $p_2 = p_1 - 1$, $F_x$ has a positive sign and $F_y$ a negative sign. A change of the flux can be taken into account by adaption of the constants.

Figure 12:
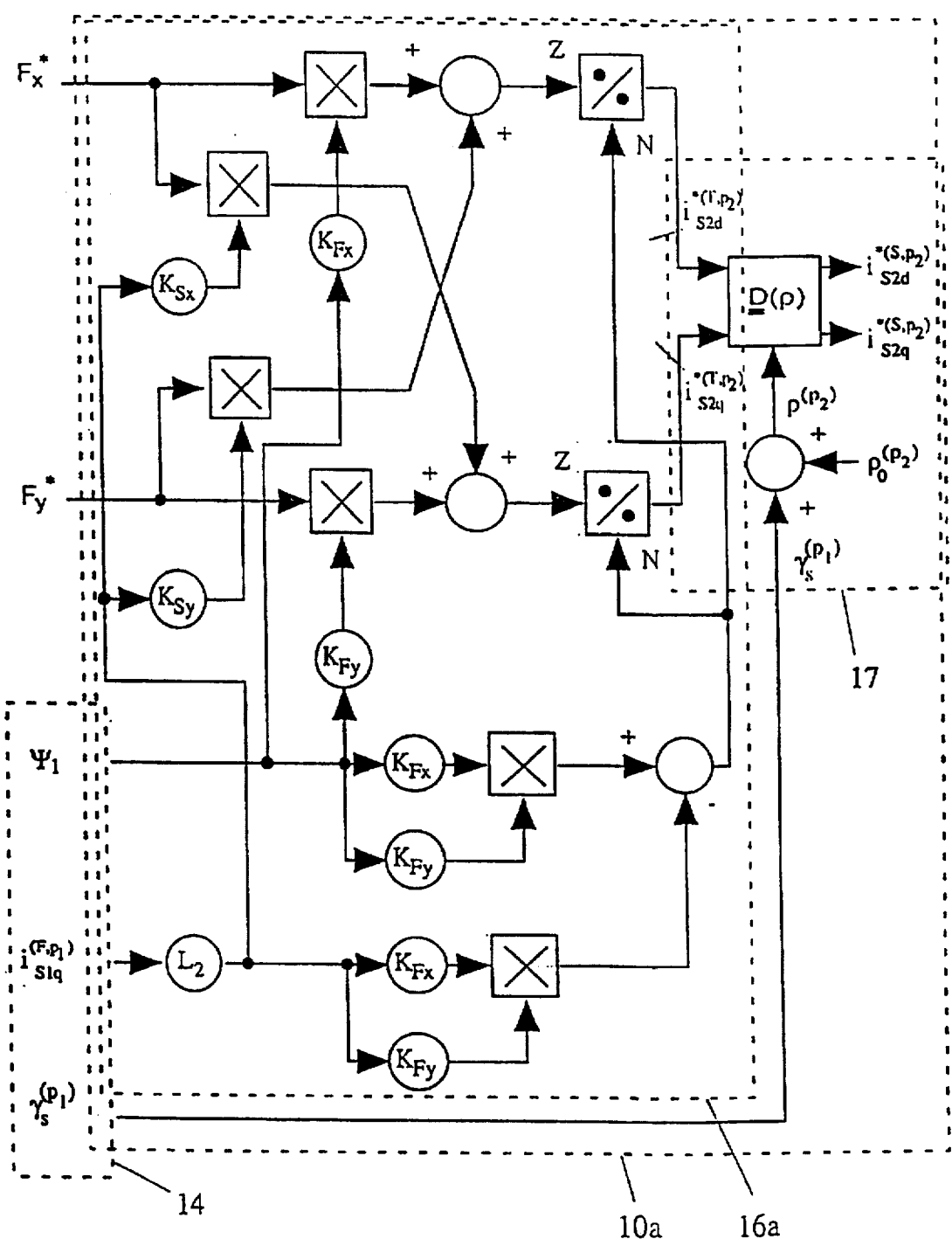
FIG. 12 illustrates the flux plan of a method in accordance with the invention for the computation of the control current of an induction machine in accordance with FIG. 7 which permits a complete decoupling of the transverse force formation from the torque formation and takes into account the useful Maxwell force, the useful Lorentz force, and also the disturbing Lorentz force.

The precise calculation of the control current in a coordinate system (T) by means of knowledge of the parameters $\psi_1$ and $i_{S1q}^{(F,p1)}$ responsible for the coupling between the torque formation and the induction machine (lower block in FIGS. 9 and 10) and the transverse force formation (18) corresponds to a further concept of the invention. A possibility for determination of the control current in vectorial form is shown in FIG. 12. The calculation of the desired control current vector $i_{S2}^{*(S,p2)}$ (represented by the vector components $i_{S2d}^{*(S,p2)}$, $i_{S2q}^{*(S,p2)}$) takes place here component-wise by means of a decoupling equation (16a):

$$i_{S2d}^{*(T,p2)} = \frac{F^*_x K_{Fy} \Psi_1 + F^*_y K_{Sx} L_2 i_{S1q}^{(F,p1)}}{K_{Fx} K_{Fy} \Psi_1^2 - K_{Sx} K_{Sy} L_2^2 i_{S1q}^{(F,p1)2}},$$

$$i_{S2q}^{*(T,p2)} = \frac{F^*_y K_{Fx} \Psi_1 + F^*_x K_{Sy} L_2 i_{S1q}^{(F,p1)}}{K_{Fx} K_{Fy} \Psi_1^2 - K_{Sx} K_{Sy} L_2^2 i_{S1q}^{(F,p1)2}}$$

based on the desired force vector $$\underline{F}^* = \begin{pmatrix} F^*_x \\ F^*_y \end{pmatrix}$$

with the aid of the torque-forming drive current component $i_{S1q}^{(F,p1)}$ considered in flux coordinates in the $p_1$-plane, and further based on the drive flux magnitude $\psi_1$, and from the machine parameters $L_2$, $K_{Fx}$, $K_{Fy}$, $K_{Sx}$ and $K_{Sy}$. These are defined for the case $p_2 = p_1 + 1$ by the relationships $K_{Fx} = K_{Fy} =$ $K_M + K_L$ and $K_{Sx} = K_{Sy} = K_S$ and for the case $p_2 = p_1 - 1$ by the relationships $K_{Fx} = K_M - K_L$, $K_{Fx} = -K_M + K_L$ and $K_{Sx} = -K_S$, $K_{Sy} = K_S$.

Figure 13:
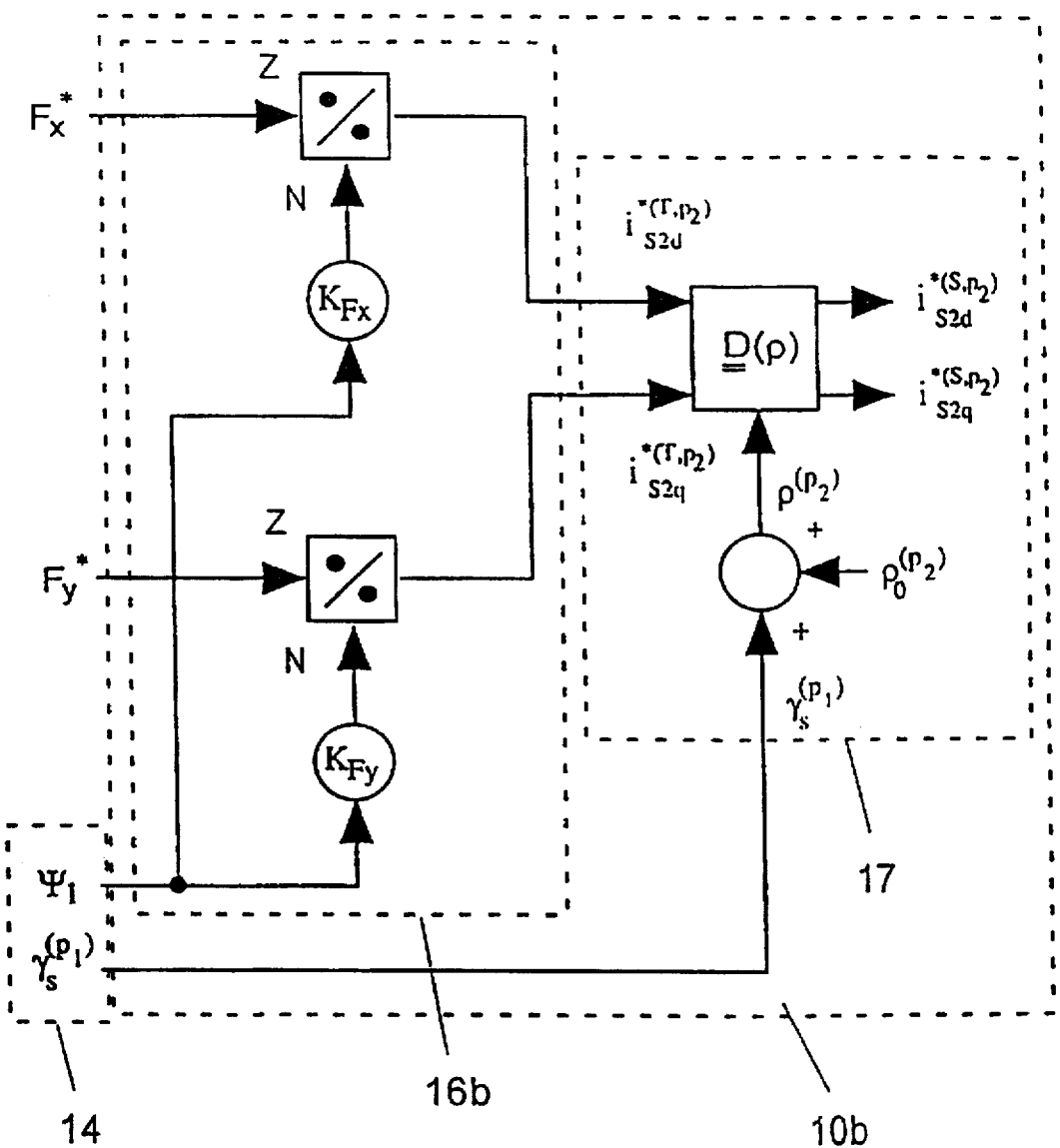
FIG. 13 illustrates a signal flux plan of a method in accordance with the invention for calculating the control current of an induction machine in accordance with FIG. 7 which permits a partial decoupling of the transverse force formation from the torque formation and only takes into account the useful Maxwell force and also the useful Lorentz force.

The influence of the disturbing Lorentz force (the component in (18) proportional to $i_{S1q}^{(F,p1)}$ is generally small compared with the maximum Maxwell transverse force. It can therefore be ignored in many applications (for example in the case of a transverse force regulation superimposed on the transverse force control). The first step in the calculation (16a) can then be substantially simplified since the cross coupling brought about by the disturbing Lorentz force need no longer be compensated. The signal flux plan of such a method simplified in this manner is shown in FIG. 13 (10b). Whereas the coordinate transformation (17) remains the same, the decoupling (16b) is reduced to a component-wise division by the flux magnitude. It reads:

$$i_{S2d}^{*(T,p2)} = \frac{F^*_x}{K_{Fx} \Psi_1}, \quad i_{S2q}^{*(T,p2)} = \frac{F^*_y}{K_{Fy} \Psi_1}.$$

The desired value of the control current vector calculated in accordance with the above methods is supplied to a current feed apparatus (for example converter) which feeds the $m_2$-phase control winding of the induction machine with the $m_2$-phase control current $i_{S2}$ (FIGS. 9 and 10) (the number of lines can be selected as desired). The drive winding can be fed with three-phase currents of any desired frequency (also the frequency 0). That is to say, the drive winding can be operated both with a rigid three-phase network and also from a three-phase current source with variable frequency and amplitude. Of particular interest is naturally the operation at a frequency converter. The control method selected for the drive of the machine can be of any desired type (characteristic control, field orientated control or regulation, etc.) The sole condition for the method is that it must ensure that a minimum machine flux is present in those operating cases in which transverse forces are to be generated.

Figure 11:
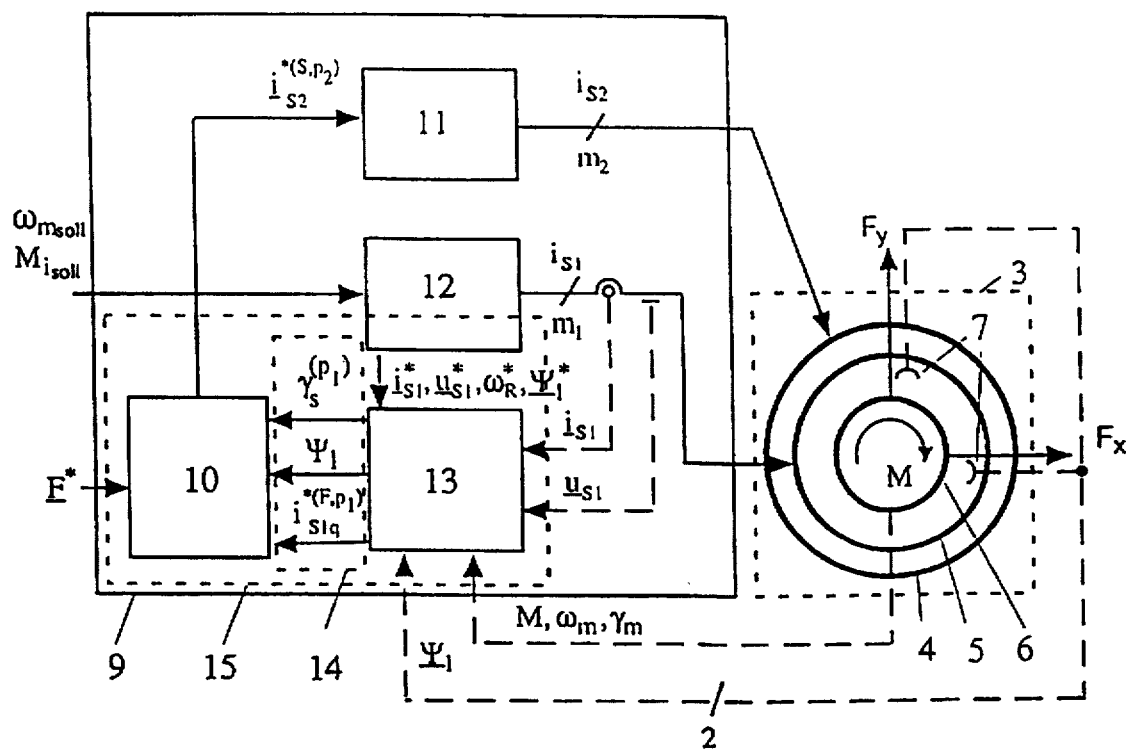
FIG. 11 illustrates the circuit diagram of the principle of a control apparatus in accordance with the invention for the control of an electrical induction machine with a special winding for the combined generation of a torque and a transverse force in the latter in accordance with FIG. 7.

The realization of the control method with technical apparatus can be conceived with a control apparatus which is schematically illustrated in FIG. 11. The control apparatus (9) comprises a signal processing module (15), an $m_2$-phase current feed module (11) for feeding the control winding, and an $m_1$-phase regulating and feed module (12) for feeding the drive winding. The current feed module (11) has the task of so feeding the control winding with $m_2$-phase currents that the actual value of the stator current vector corresponds as closely as possible to the desired value preset by the signal processing module. This object can be satisfied for example with an $m_2$-phase current impressing frequency converter (intermediate circuit voltage frequency converter with a current regulator or intermediate circuit current frequency converter) over an $m_2$-channel linear current amplifier. An $m_1$-phase frequency converter or an $m_1$-phase linear amplifier which is combined with a drive regulator operating in accordance with any desired method can likewise be used as the regulator and feed module for the feed of the drive winding (12). The signal processing module (15) is most simply realized with a digital computer, for example with a signal processor system. It consists of two-part modules: In block (10) the signal run plan (10a) in FIG. 12 or (10b) in FIG. 13 is realised. In block (13) the parameters $\psi_1$, $\gamma_S^{(p1)}$ and $i_{S1q}^{(F,p1)}$ are determined with the aid of machine equations from measured and/or desired values (designated with *). The blocks (10) and (13) can be implemented as part programs on the same microcomputer, they can run as programs on different processors, or they can be realized wholly or partly by specialized digital or analog signal processing hardware.

Although any desired control method is possible for the control of the drive winding, it is sensible to control or to regulate the drive in a field orientated manner. Since the size and phase of the flux vector must in any case be known for the method of the invention for the control of the transverse force, the additional effort for a field orientated drive regulation is only small. The FIGS. 14 to 21 show different examples for an asynchronous machine and also for a synchronous machine.

Figure 14:
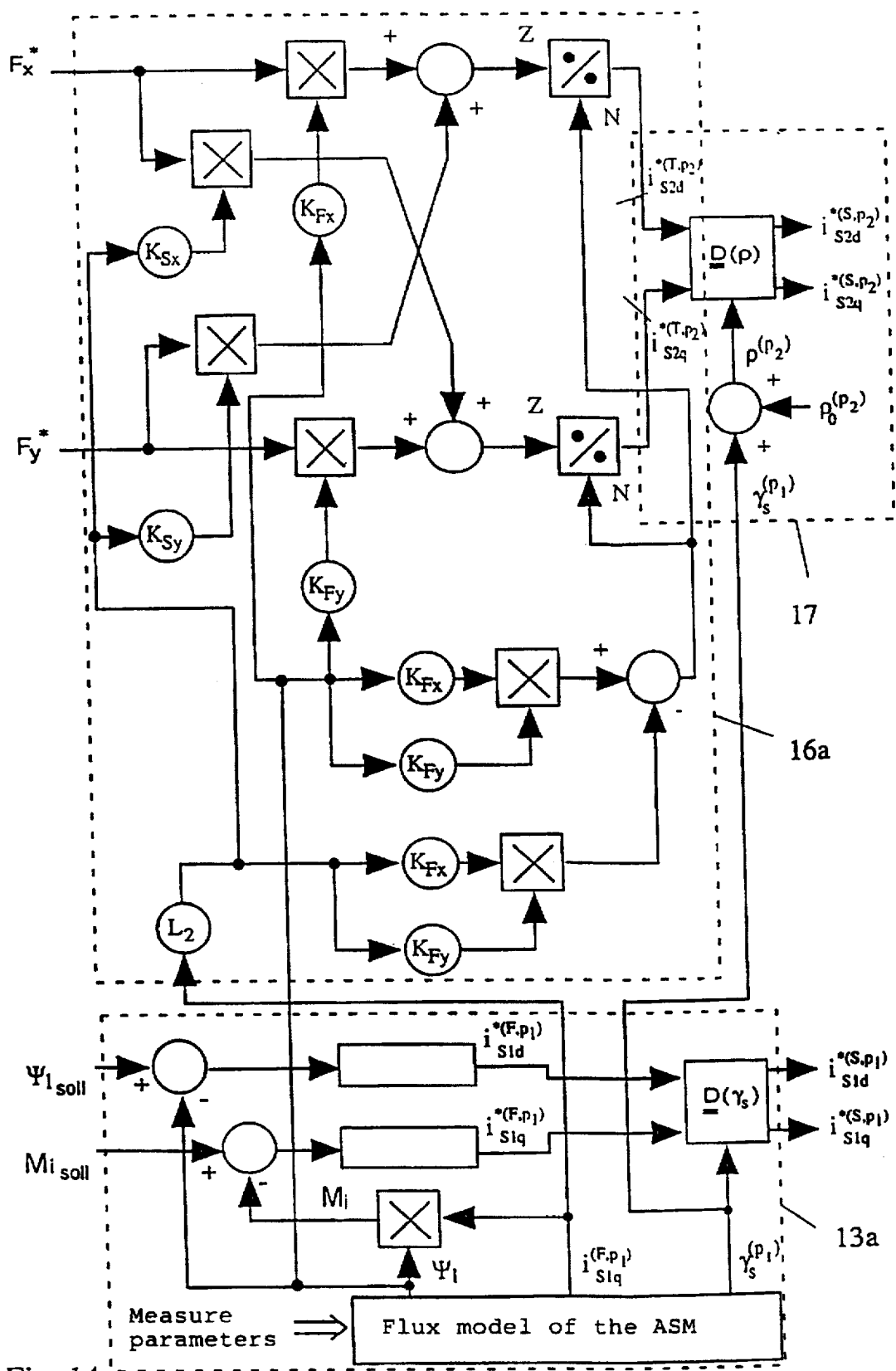
FIG. 14 illustrates a signal flux plan of a method in accordance with the invention for calculating a control current of an asynchronous machine in accordance with FIG. 9 which relates to the combination of the method of FIG. 12 with a "field orientated regulation" of the drive current.
Figure 15:
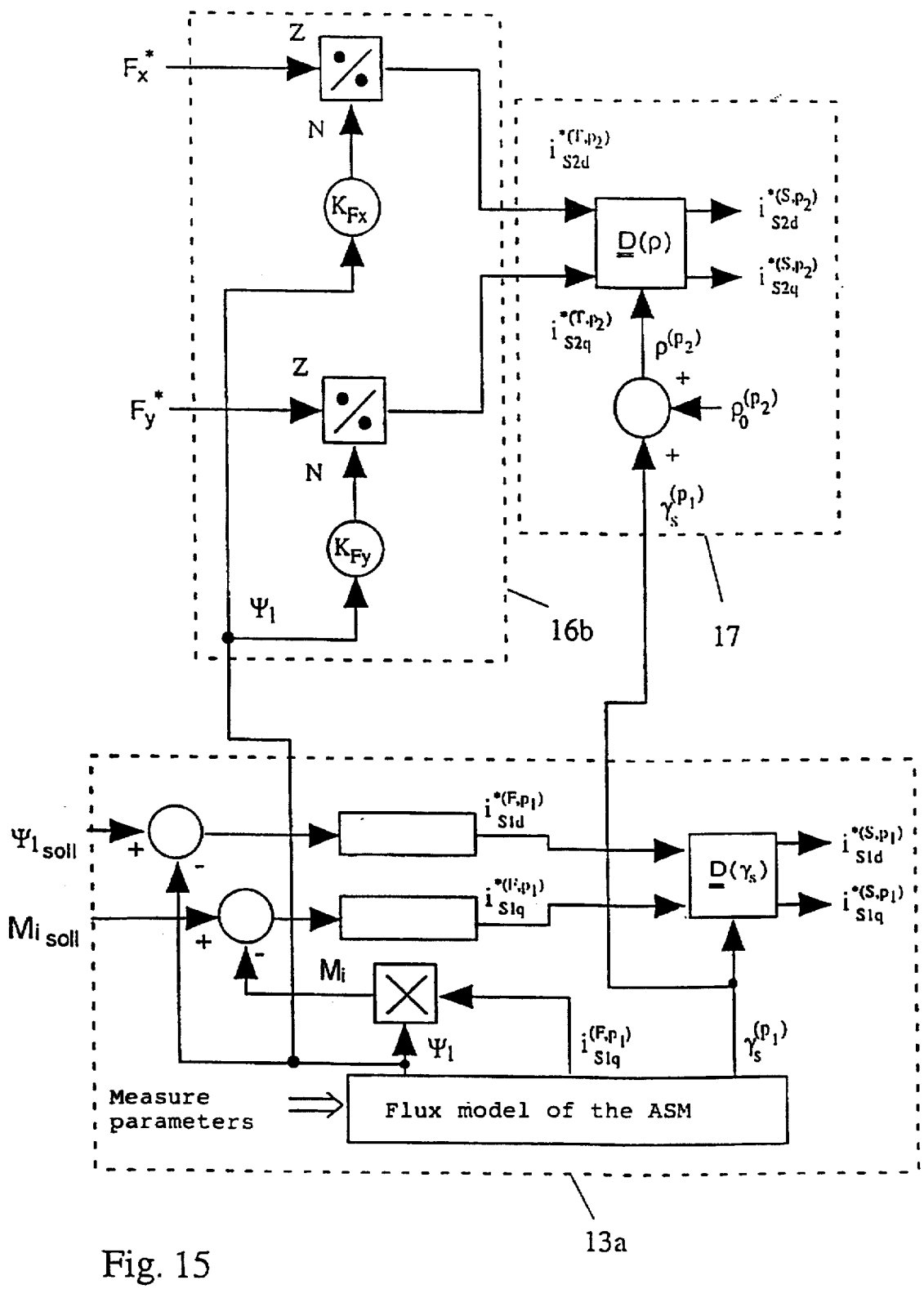
FIG. 15 illustrates a signal flux plan of a method in accordance with the invention for the calculation of the control current of an asynchronous machine in accordance with FIG. 9 which relates to the combination of the method of FIG. 13 with a "field orientated regulation" of the drive current.

FIG. 14 shows the example of a combination of a field orientated torque regulation of an asynchronous machine (13a) with the transverse force control of the invention with complete decoupling which takes account of the Lorentz disturbing force (16a). The magnetization components of the drive current $i_{S1d}$ and its torque-forming component $i_{S1q}$ are regulated here in the $p_1$-plane in a coordinate system (F) which rotates with $\gamma_S^{(P1)}$ and is orientated to the flux pointer. Thus, a decoupling of the torque formation and the flux formation is ensured, whereby a very dynamic torque-setting is achieved by $i_{S1q}$. The drive current is subsequently transformed into the stator coordinate system via a coordinate rotation through $\gamma_S^{(P1)}$. The parameters $\psi_1$, $\gamma_S^{(P1)}$ and $i_{S1q}^{(F,P1)}$ are jointly used here for field orientated torque regulation and also for the transverse force control method. The advantage of this combination for the transverse force control lies in the precise regulation of the flux magnitude to a predetermined value. The field orientated drive regulation can naturally also be combined with the simplified transverse force control of the invention with only partial decoupling which does not take account of the disturbing Lorentz force (16b). This example is shown in FIG. 15 In distinction to FIG. 14, $i_{S1q}^{(F,P1)}$ is not required here for the transverse force control. In other respects, the same applies here as also said in FIG. 14.

Figure 16:
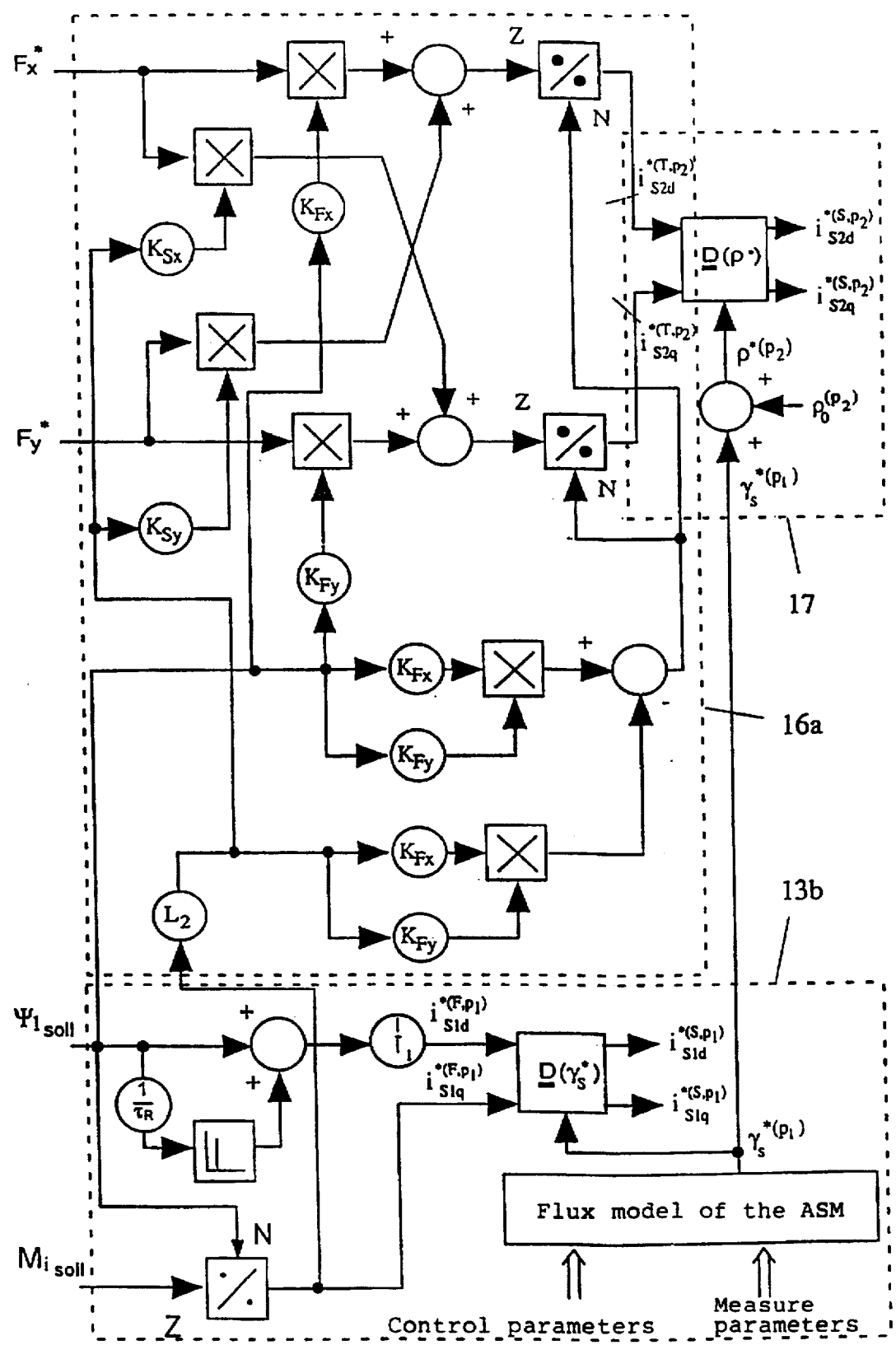
FIG. 16 illustrates a signal flux plan of a method in accordance with the invention for the calculation of the control current of an asynchronous machine in accordance with FIG. 9 which relates to the combination of the method of FIG. 12 with a "field orientated control" of the drive current.
Figure 17:
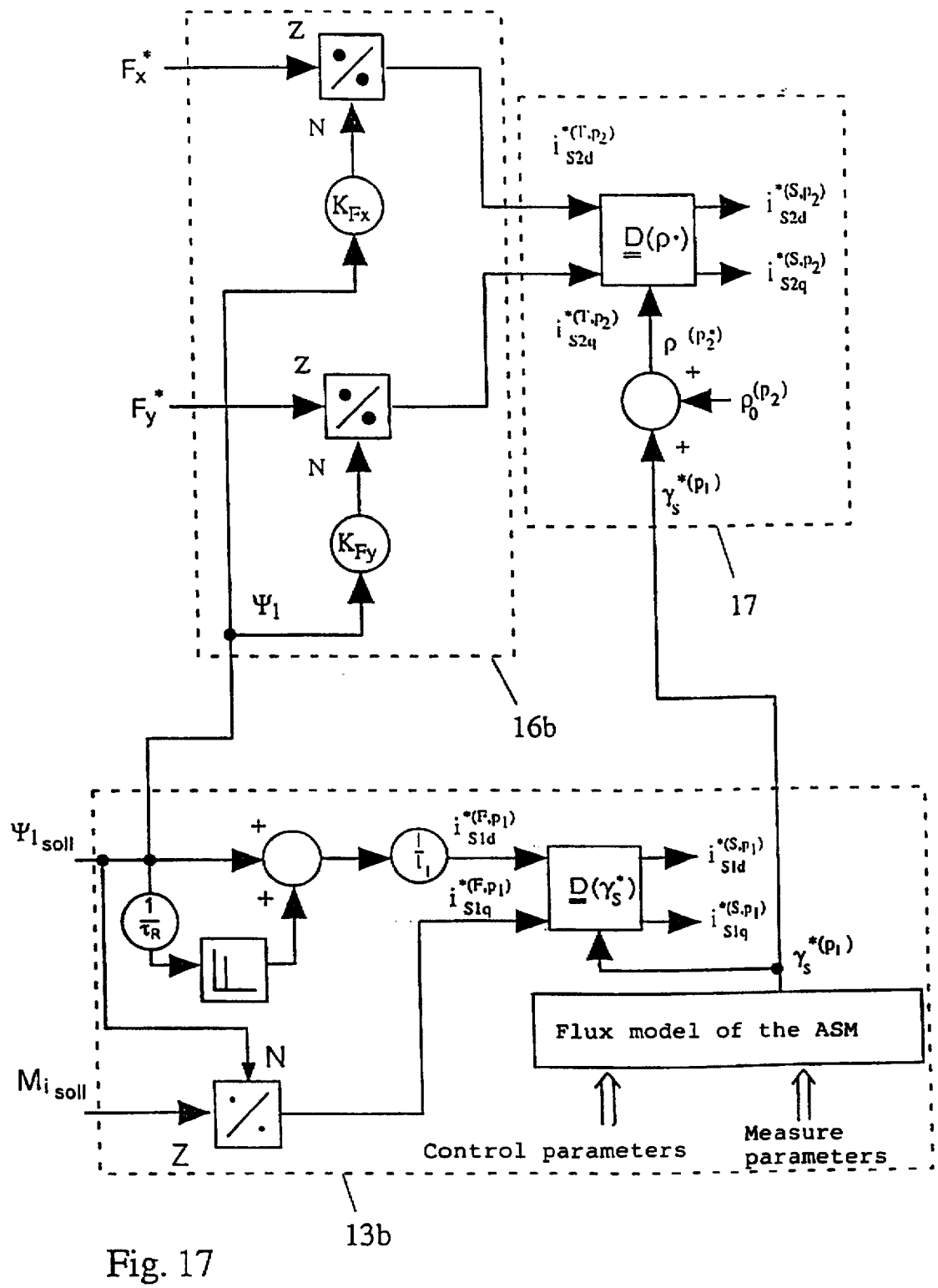
FIG. 17 illustrates a signal flux plan of a method in accordance with the invention for the calculation of the control current of an asynchronous machine in accordance with FIG. 9 which relates to the combination of the method of FIG. 13 with a "field orientated control" of the drive current.

A simplification relative to the control method in FIGS. 14 and 15 results from the fact that the drive flux is not regulated, but rather only controlled in field orientated manner. FIG. 16 shows the example of the combination of a possible field orientated torque control of the asynchronous machine (13b) with the transverse force control in accordance with the invention with complete decoupling which takes account of the disturbing Lorentz force (16a). In contrast, for a field orientated regulation the magnetization components of the drive current $i_{S1d}$ and of its torque-forming component $i_{S1q}$ in the drive flux orientated, rotating coordinate system (F) are here not regulated, but rather controlled. The most important simplification results from the fact that the flux vector does not have to be determined from the point of view of size and direction. Only a model value of the flux angle $\gamma_S^{*(P1)}$ is used for the transformation of the control current from the rotating coordinate system (F) into the stator coordinate system. The model value $\gamma_S^{*(P1)}$ can be determined on the basis of desired values (for example $Mi_{soll}$, $\psi_{1soll}$) and from eventually simply detectable measurement parameters (for example $\omega_m$, $\gamma_m$) from the machine model. $\gamma_S^{*(P1)}$ is also used for the coordinate transformation in the transverse force control method. The control parameters $\psi_1^*$, $i_{S1q}^{*(F,P1)}$ are used in place of the parameters $\psi_1$, $i_{S1q}^{(F,P1)}$. The field orientated drive control can naturally also be combined with the simplified transverse force control of the invention with only partial decoupling which does not take account of the disturbing Lorentz force (16b). This example is shown in FIG. 17. In distinction to FIG. 16, $i_{S1q}^{*(F,P1)}$ is not required here for the transverse force control. In other respects the same applies as also said in connection with FIG. 16.

Figure 18:
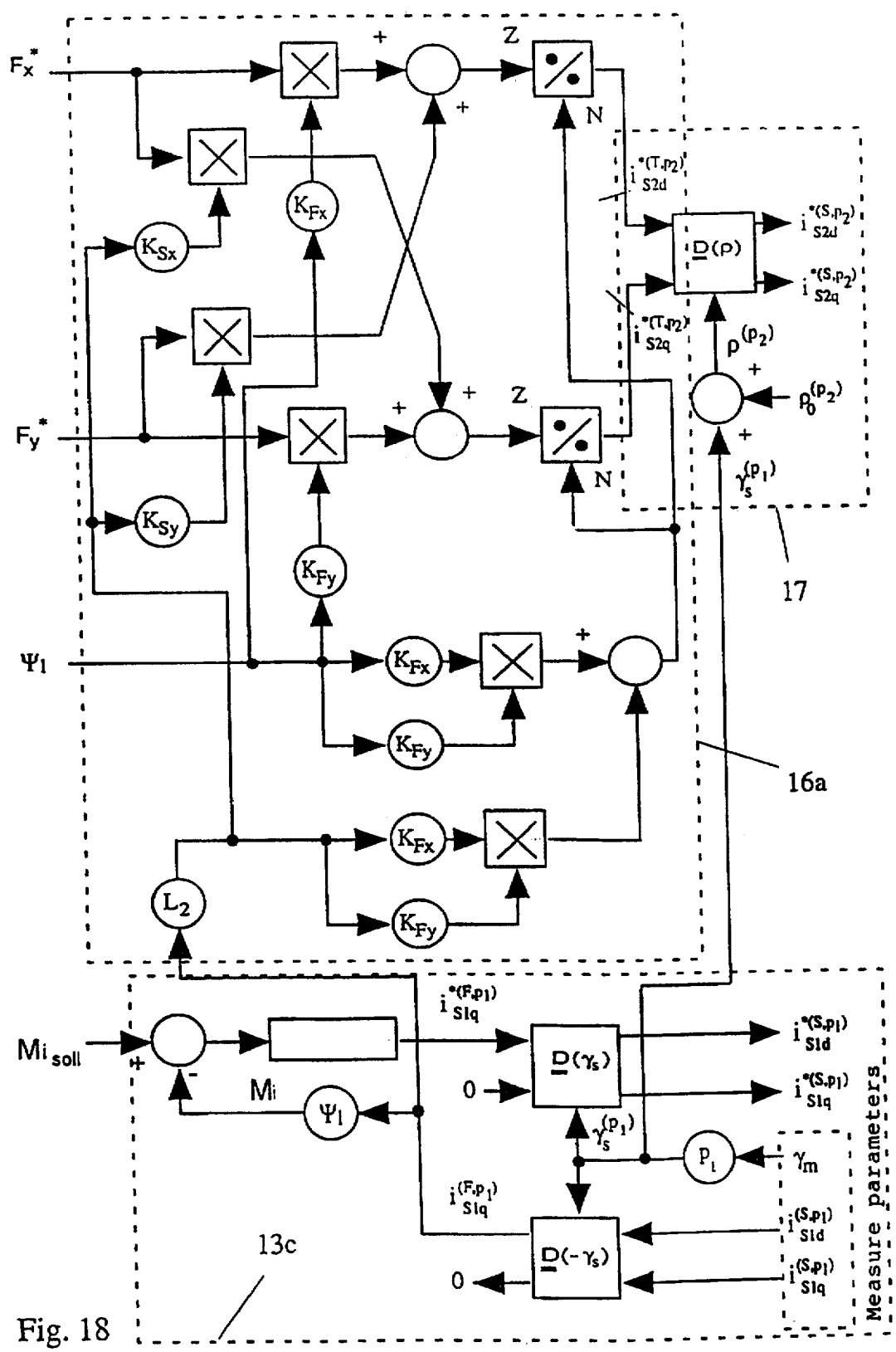
FIG. 18 illustrates a signal flux plan of a method in accordance with the invention for the calculation of the control current of a synchronous machine in accordance with FIG. 10 which relates to the combination of the method of FIG. 12 with a "field orientated regulation" of the drive current.
Figure 19:
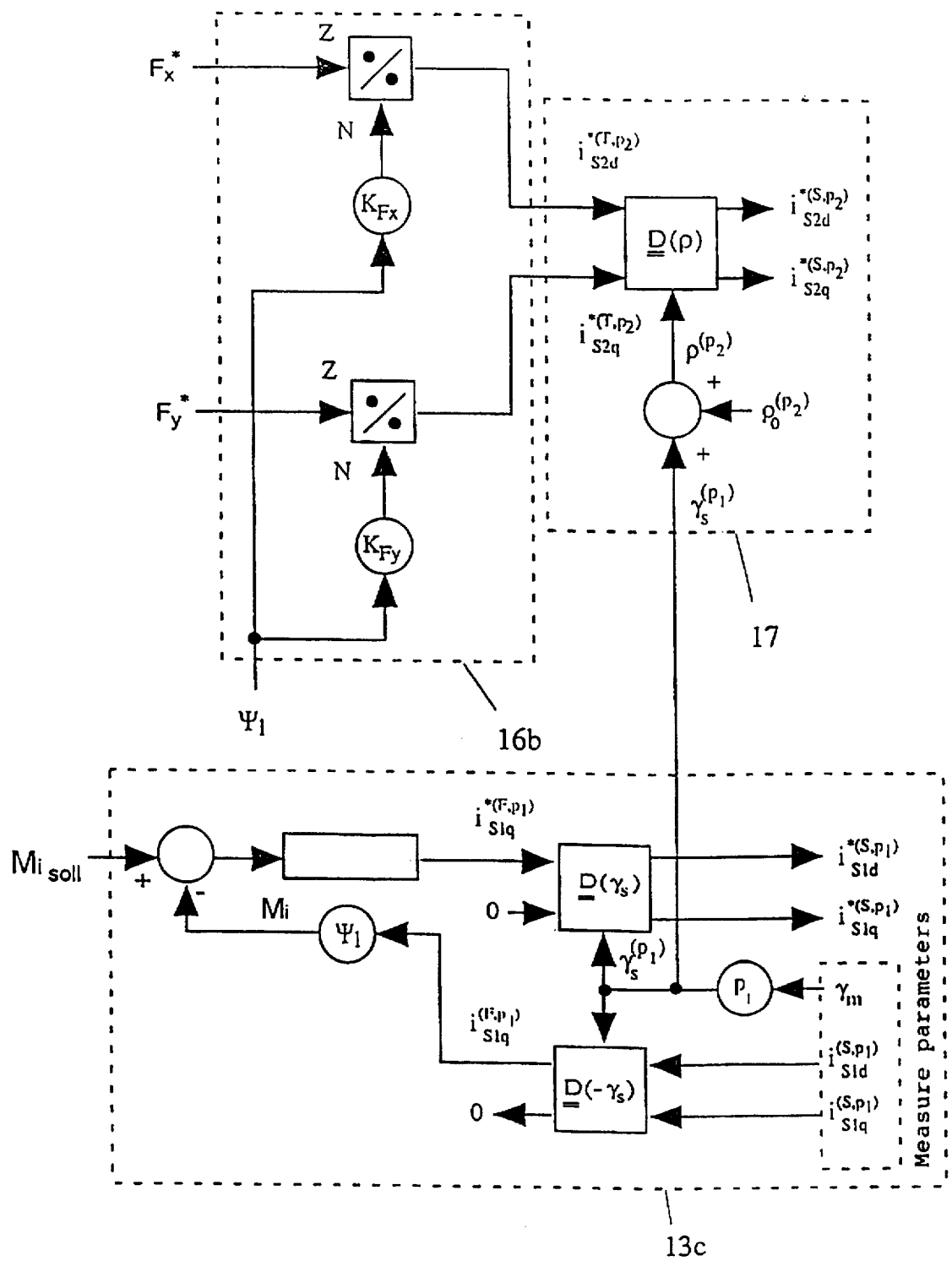
FIG. 19 illustrates a signal flux plan of a method in accordance with the invention for the calculation of the drive current of a synchronous machine in accordance with FIG. 10 which relates to the combination of the method of FIG. 13 with a "field orientated regulation" of the drive current.

In distinction to asynchronous motors, synchronous motors are normally controlled in field orientated manner. Since the flux in the synchronous machine is fixedly coupled to the rotor, the flux angle $\gamma_S^{(P1)}$ can be quite simply determined from the mechanical rotor angle $\gamma_m$ by multiplication with $p_1$. FIG. 18 shows the example of the combination of a field orientated torque regulation of a synchronous machine (13c) with the transverse force control of the invention with complete decoupling which takes account of the disturbing Lorentz force (16a). In the synchronous machine the drive flux is generated via a DC current in the rotor winding or with permanent magnets on the rotor. $\psi_1$ is thus supplied as a machine parameter to the transverse force control. The drive current has in the synchronous machine only a torque-forming component and corresponds thus directly to $i_{S1q}$. This can be measured and transformed into the flux coordinate system (F). The transformation in accordance with (F) is the same value as the formation of the magnitude The drive current $i_{S1q}^{(F,P1)}$ is then used both for the torque regulation and also for the transverse force control. The drive flux angle is here, as said, determined via the mechanical rotor angle. The field orientated drive regulation of the synchronous machine can naturally also be combined with the simplified transverse force control of the invention with only partial decoupling which does not take account of the disturbing Lorentz force (16b). This example is shown in FIG. 19. In distinction to FIG. 18 $i_{S1q}^{(F,P1)}$ is required here for the transverse force control. In other respects, the same applies as was said in connection with FIG. 18.

Figure 20:
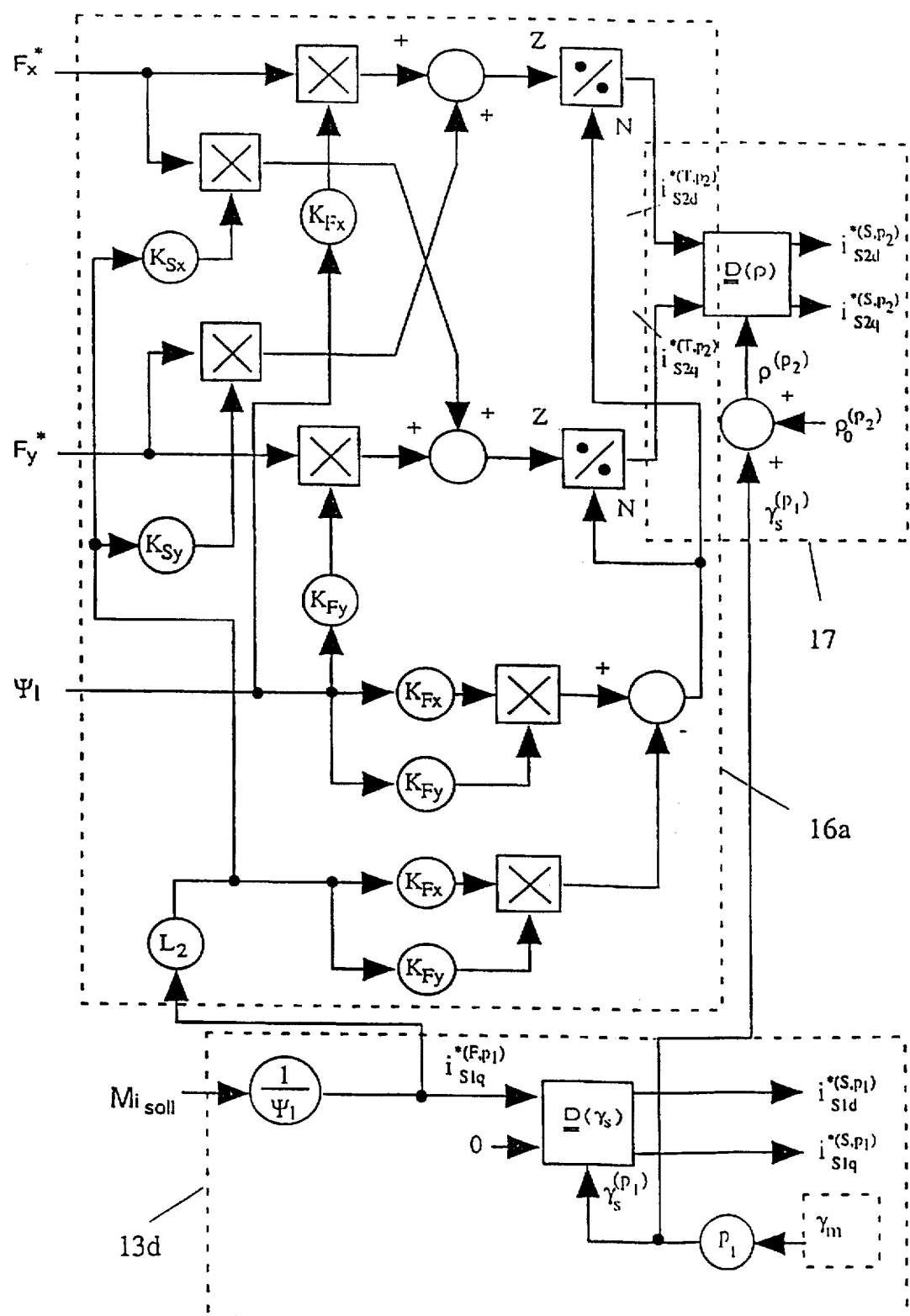
FIG. 20 illustrates a signal flux plan of a method in accordance with the invention for the calculation of the control current of a synchronous machine in accordance with FIG. 10 which relates to the combination of the method of FIG. 12 with a "field orientated control" of the drive current.
Figure 21:
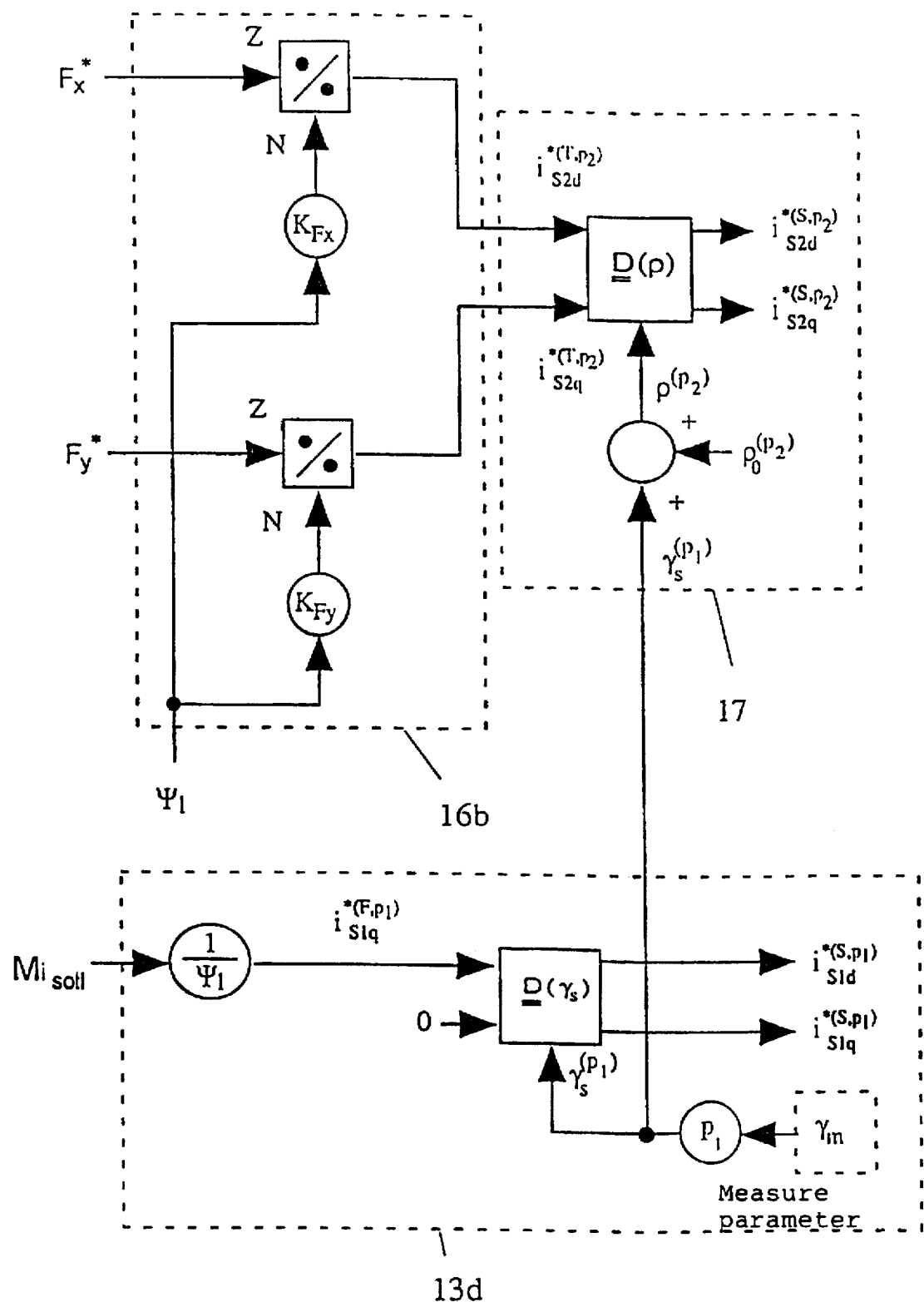
FIG. 21 illustrates a signal flux plan of a method in accordance with the invention for the calculation of the control current of a synchronous machine in accordance with FIG. 10 which relates to the combination of the method of FIG. 13 with a "field orientated control" of the drive current.

The field orientated torque control of the synchronous machine is more frequent than the field orientated torque regulation since in practice a speed of rotation regulation circuit is mainly superimposed from the torque regulation circuit. FIG. 20 shows the example of a combination of a field orientated torque regulation of a synchronous machine (13c) with the transverse force control of the invention with complete decoupling which takes account of the disturbing Lorentz force (16a). The drive current is now controlled directly proportional to the torque and reversely proportional to the drive flux. This control value is likewise used by transverse force control methods. As a measurement parameter only the mechanical rotor angle $\gamma_m$ is required. From this, $\gamma_S^{(P1)}$ is derived and is fed both to the torque control and also to the transverse force control. The field orientated drive control of the synchronous machine can naturally also be combined with the simplified transverse force control of the invention with only partial decoupling which does not take account of the disturbing Lorentz force (16b). This example is shown in FIG. 21. In distinction to FIG. 20, the drive current is not required here for the transverse force control. In other respects, the same applies as was said in connection with FIG. 20.

Figure 22:
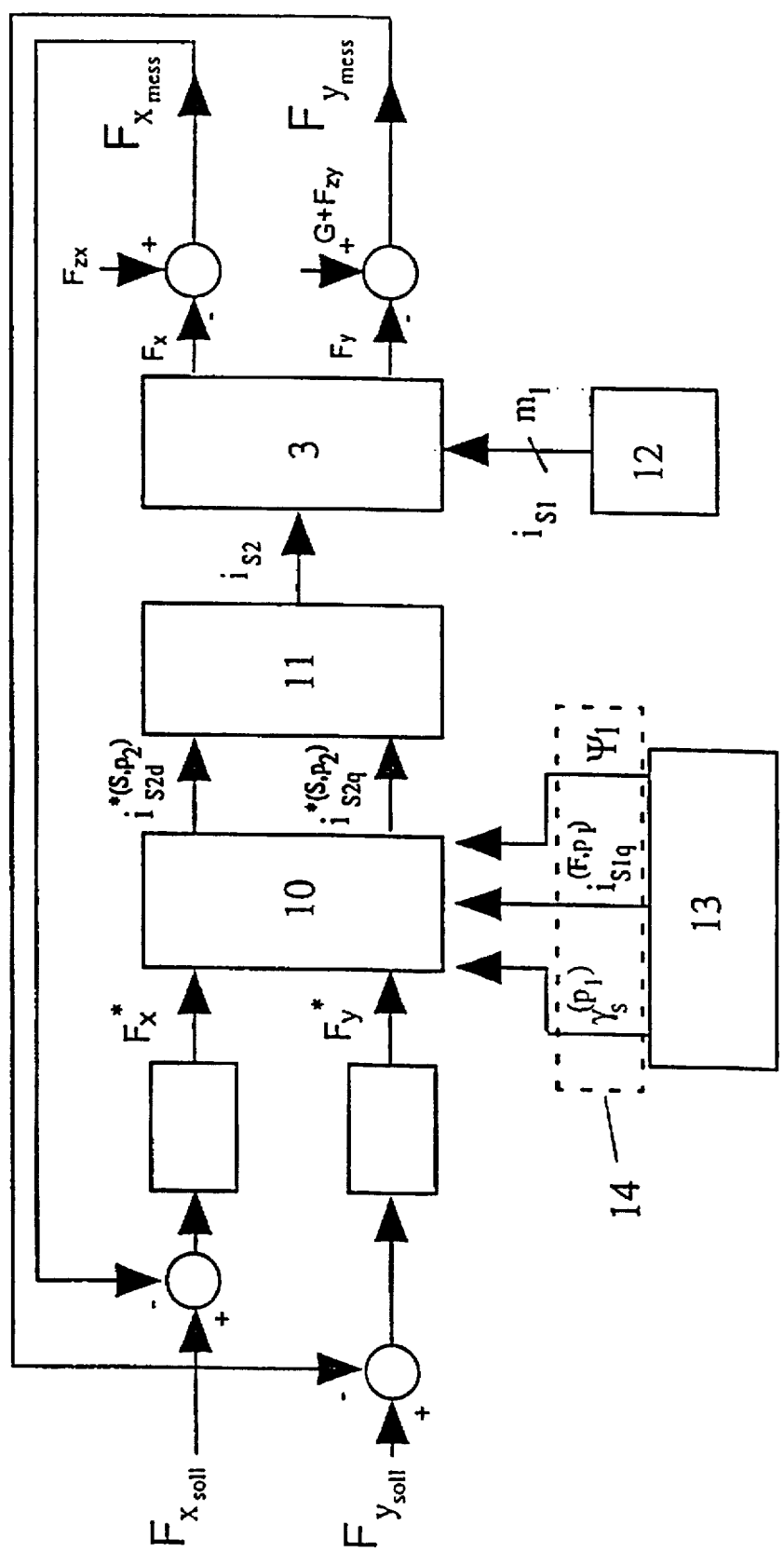
FIG. 22 illustrates a signal flux plan of a method in accordance with the invention for regulating the transverse force of an induction machine in accordance with FIG. 7.

If a very accurate adjustment of the transverse force acting on the rotor is required, then it can be sensible to not control this but rather to regulate it. For this purpose, the transverse force is measured in one or in two directions by means of force sensors (for example with strain gauges mounted on a bending beam or a load cell with piezoelectric sensors). If the transverse force is only to be regulated in one direction, then this is most simply measured in the same direction in which it is regulated. The measured value is subtracted from the desired value and the so-formed control deviation is fed to a single parameter regulator. The regulator output is split up into an x-component and a y-component (if the direction of the desired force corresponds with the x- or y-axis then a splitting up into components can be avoided) and is fed to the transverse force control in accordance with claim 1 and claim 2 ($F_x^*$ and $F_y^*$). If the force is measured in two directions (preferably perpendicular to one another), then the planar actual force vector can be determined. The two vector components $F_x$ and $F_y$ are substracted from the desired values and the controlled deviations are fed to two independent regulators. The regulator outputs are connected to the inputs ($F_x^*$ and $F_y^*$) of the transverse force control. FIG. 22 shows a schematic block diagram of the transverse force regulation.

Figure 23:
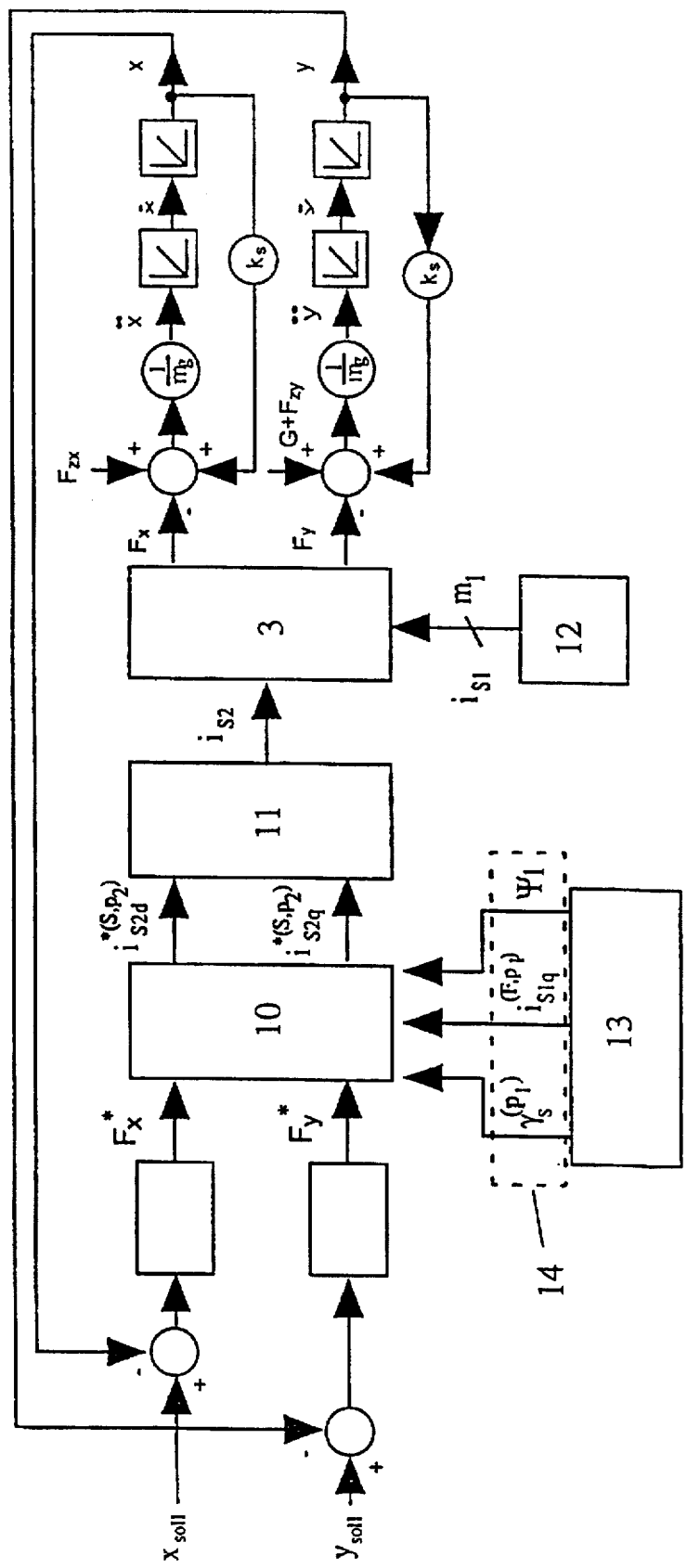
FIG. 23 illustrates a signal flux plan of a method in accordance with the invention for regulating the transverse rotor position of an induction machine in accordance with FIG. 7.
Figure 24:
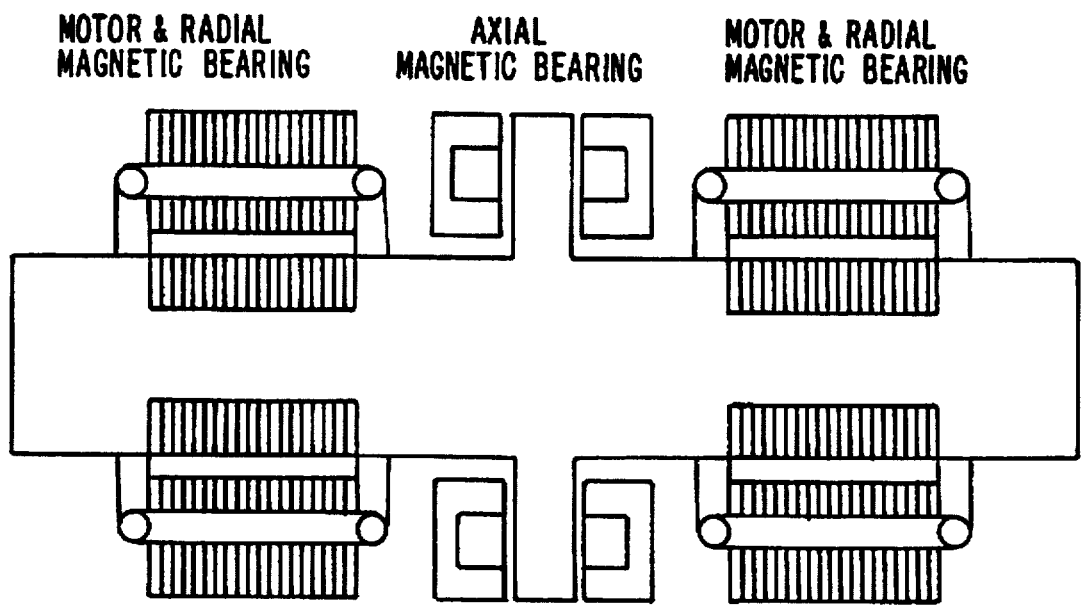
FIG. 24 "Bearingless induction machine" comprising two-part machines in accordance with FIG. 7 in which both the torque formation and also the radially active magnetic support of the rotor takes place by the part machines.
Figure 25:
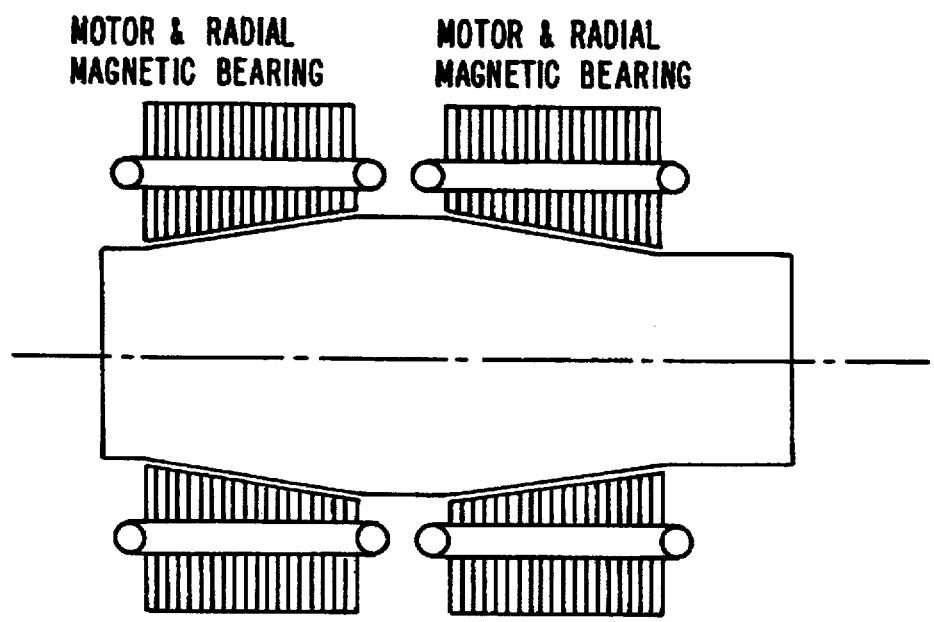
FIG. 25 illustrates a bearingless rotary field machine comprising two-part machines in accordance with FIG. 7, the rotor of which is conically shaped and in which both the torque formation and also the radially and axially active magnetic support of the rotor takes place by the part machines.

If the rotor is displaceable in one or more directions (the transverse section plane), then its position can also be influenced with the aid of transverse forces. If the rotor position is determined by means of sensors, or via an observer, then this can be regulated. FIG. 23 shows the schematic block diagram of a possible transverse thrust regulation for two axes. The rotor position (x, y) is determined by position sensors or via an observer. In the illustration of FIG. 23 the origin of the coordinates lies at the center of the machine. The actual position is subtracted from the desired position ($x_{soll}$, $y_{soll}$) and the control difference is supplied to a regulator. The regulation takes place most simply component-wise as illustrated in FIG. 23. As a regulator one can consider a proportional plus derivative action controller, a proportional, integral plus derivative action controller, or a status regulator with a status observer. The regulator output is connected to the input ($F_x^*$ and $F_y^*$) of the transverse force control (10). The current control apparatus (11) then controls in known manner the induction machine with a special winding (3) in accordance with FIG. 9 or 10. The association which is not shown in (3) between the transverse force and the rotor position (double integrator) and the magnetic pull (positive return) acting as a result of the displacement of the rotor from the center have been externally supplemented in FIG. 23. With the described transverse thrust regulation, two degrees of freedom of the rotor can be regulated. As an application, the realization of a radial magnetic bearing in an induction machine is conceivable. Two such induction machines with transverse thrust regulation can be combined into a bearingless machine, that is to say to one machine in which a torque is generated via the drive windings and magnetic radial bearing forces are generated via the two control windings. The axial position of the rotor can be stabilized by an additional axial magnetic bearing or by a conical shape of the rotor. The principal build-up of such a "bearingless" rotary field machine is shown in FIG. 24. If the two part machines are equipped as shown in FIG. 25 with conical rotors, then the axial position can likewise be determined via the drive flux distribution between the two part machines. As a result of the same bearing force action, a bearingless motor of this kind also principally has the same characteristics as the conventional active magnetically journalled drive. These result from the freedom of contact of the support and the possibility of setting adjustments via the regulation. Thus the magnetic support is free of wear, servicing and lubricants. The maximum permissible speed of rotation is restricted only by the centrifugal loading of the rotor. The bearing characteristic, that is to say the stiffness and the damping, can be set during operation via the regulation and can be adapted to changing conditions. A compensation of imbalance forces is conceivable in just the same way as the active damping of bending oscillations of the rotor. With an integral component of the regulator, an infinitely large stiffness can be achieved in the stationary operating state. Within the limits of the air gap, the position and also the angle of inclination of the rotor can be set and changed during operation.

Figure 26:
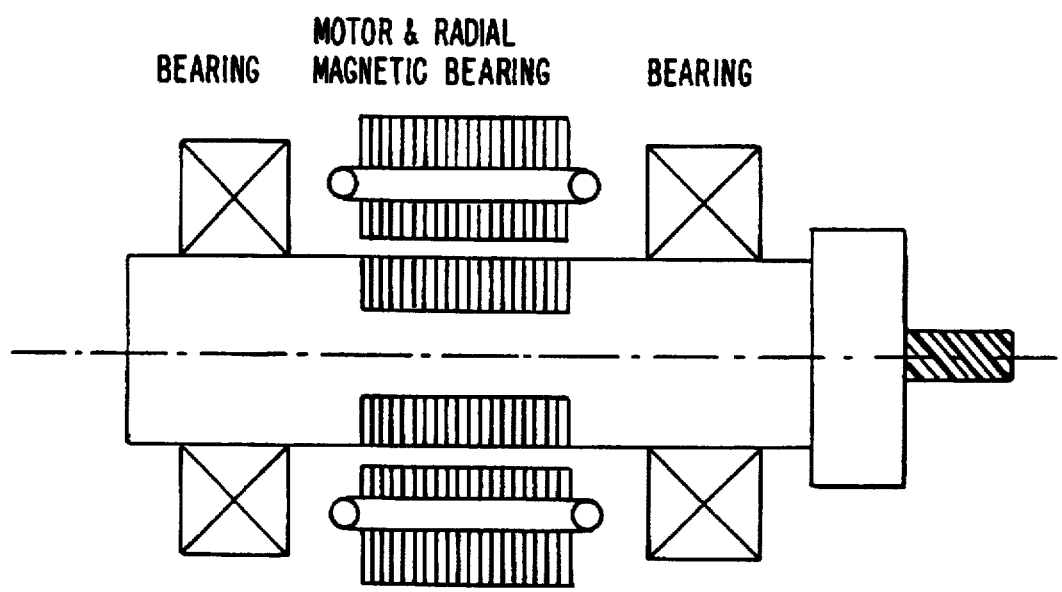
FIG. 26 illustrates a conventionally journalled induction machine in accordance with FIG. 7, in which transverse forces can be exerted on the rotor.
Figure 27A:
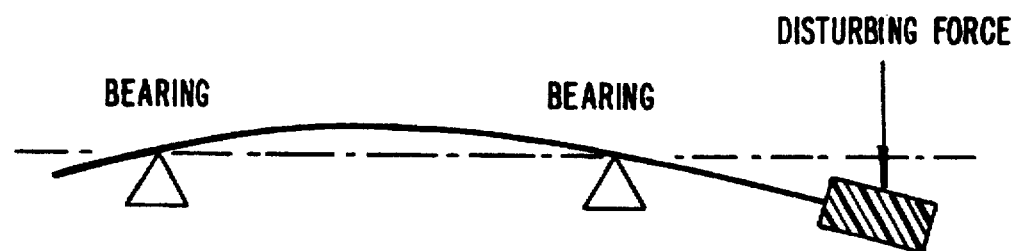
FIGS. 27a and 27b are schematic illustration of the possibility of influencing the bending deflection of the rotor in a machine in which a transverse force can be applied in addition to the torque.
Figure 27B:
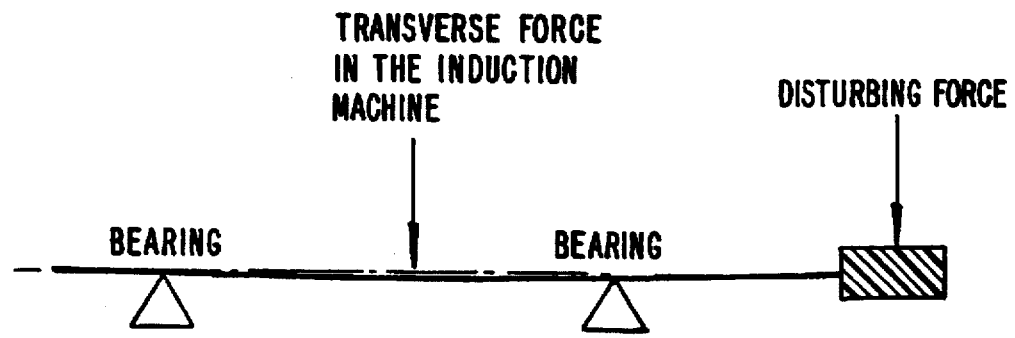

The bearingless machine, however, opens up further advantages. As the magnetic transverse forces act distributed over the whole rotor and not only at the two ends, as with conventional journalling, an efficient means is available for influencing the dynamics of the rotor. Moreover, the achievable bearing forces are very large since the total surface of the machine rotor is available for the force formation. Quite new perspectives are opened up in combination with conventionally journalled machines (ball bearings, air bearings, magnetic bearings, hydrostatic and hydrodynamic bearings) with a bearingless motor. A machine of this kind is schematically illustrated in FIG. 26. Through the possibility of being able to dynamically set the transverse forces acting on the rotor with any desired direction of amplitude, new principles of solution result for the damping of rotor oscillations, for influencing the bearing characteristics, for leaving the conventional rotor, or for influencing the through-bending of the rotor. The latter application is schematically illustrated in FIG. 27.

Reference numeral list 1 drive winding parameter (indices)

2 control winding parameter (indices)

3 induction machine with a $p_1$-pole-paired drive winding and a ($p_2=p_1\pm1$)-pole-paired control winding 3a asynchronous machine with transverse force formation and torque formation 3b synchronous machine with transverse force and torque formation 4 control winding 5 drive winding 6 rotor 7 flux measurement probes 9 control apparatus 10 control current calculation 10a a control current calculation with complete decoupling 10b control current calculation with partial decoupling 11 current feed apparatus for control winding 12 second means 13 flux calculation and transformation 14 drive parameters 15 first means 16a a complete decoupling 16b partial decoupling 17 coordinate transformation (T->S)

d direct component (dq representation)

F transverse force vector $F_x$ x component of the transverse force vector $F_y$ y component of the transverse force vector (F) drive flux orientated coordinate system example: $i_{S1q}^{(F,p1)}$ designates the transverse components of the drive current vector in drive flux coordinates illustrated in the $p_1$ plane $K_L$ Lorentz useful force constant: for synchronous machine $$K_L = \frac{mp_1w_2}{2rw_1},$$

for an asynchronous machine: $K_L=0$ $K_M$ Maxwell force constant:

$$K_M = \frac{\pi p_1 p_2 L_2}{4l\mu_0 w_1 w_2}$$

$K_S$ Lorentz disturbing force constant $$K_S = \frac{mp_2w_1}{2rw_2}$$

$K_{Fx}$ force constant in the x direction
$K_{Fy}$ force constant in the y direction
$K_{Sx}$ disturbing force constant in the x direction
$K_{Sy}$ disturbing force constant in the y direction
$i_{S1}^{(p1)}$ represents the drive current vector in the $p_1$ plane
$i_{S1d}^{(p1)}$ represents the direct component of the drive current vector in the $p_1$ plane
$i_{S1q}^{(p1)}$ represents the transverse component of the drive current vector in the $p_1$ plane
$i_{S2}^{(p2)}$ represents the control current vector in the $p_2$ plane
$i_{S2d}^{(p2)}$ represents the direct component of the control current vector in the $p_2$ plane
$i_{S2q}^{(p2)}$ represents the transverse component of the control current vector in the $p_2$ plane
l length of the rotor
$L_1$ main inductance of the drive winding
$L_2$ main inductance of the control winding
m phase number, string number
$m_g$ mass of the rotor
M torque
$M_i$ internal machine torque
$M_L$ load torque
p pole pair number
$p_1$ pole pair number of the drive winding
$p_2$ pole pair number of the control winding
($p_1$) plane of illustration with the pole pair number $p_1$
($p_2$) plane of illustration with the pole pole pair number $p_2$
q transverse component (dq representation)
R rotor
r radius of rotor
S stator
(S) stator orientated coordinate system for example: $i_{S2}^{(S,p2)}$ designates the control current vector in stator coordinates illustrated in the $p_1$ plane
(T) coordinate system rotating with the angle ρ for example: $i_{S2}^{(T,p2)}$ designates the control current vector in a coordinate system rotating with the angle $\rho^{(p2)}$ illustrated in the $p_1$ plane
$w_1$ winding number of the drive winding
$w_2$ winding number of the control winding
X,Y axes of the geometrical coordinate system (indices)
x,y deflection of the rotor in the x,y direction
* desired values, control values example: $i_{S2}^{*(S,p2)}$ designates the desired value of the control current vector in stator coordinates illustrated in the $p_1$ plane
$\alpha_0$ mutual rotation of the d axis of the drive winding relative to the x-axis of the geometrical coordinate system
$\alpha_{1,2}$ mutual rotation of the d axes of the drive and control windings
$\gamma_m$ mechanical rotor angle
$\gamma_S^{(p1)}$ argument of the drive flux vector illustrated in the $p_1$ plane
$\mu_o$ magnetic field constant in vacuum
π circuit constant
$\psi_1$ drive flux value
$\psi_1^{(p1)}$ drive flux vector illustrated in the $p_1$ plane
$\rho^{(p2)}$ mutual rotation of the coordinate system (T) used to calculate the desired control current vector relative to the stator coordinate system measured in the $p_2$ plane
$\rho_o^{(p2)}$ time invariable component of $\rho^{(p2)}$
$\omega_m$ mechanical frequency of rotation
$\omega_R$ rotor frequency of rotation (slip frequency).

What is claimed is:

1. A method for controlling an AC-machine having a rotor and a stator that includes a stator winding for combined generation of a torque and a transverse force F which acts perpendicular to the rotor and whose magnitude and direction can be adjusted as desired, the stator winding including a drive winding with a pole pair number $p_1$ and a control winding with a pole pair number $p_2$ that is defined by $p_2=p_1\pm1$, wherein the drive winding of the stator winding is supplied with a drive current $i_{S1}$ for generating a drive flux which can be represented in an electrical $p_1$-plane by its magnitude and its argument, the $p_1$-plane being associated with the pole pair number $p_1$ of the drive winding, and the control winding of the stator winding is supplied with a control current $i_{S2}$ independently of the drive current $i_{S1}$, which control current $i_{S2}$ generates a control flux which can be represented in an electrical $p_2$-plane by its magnitude and its argument, the $p_2$-plane being associated with the pole pair number $p_2$ of the control winding, the method comprising the steps of a) determining an argument $\gamma_S^{(p1)}$ of the drive flux in the $p_1$-plane, b) determining, in a coordinate system (T) that is rotating with an angle that corresponds to said argument $\gamma_S^{(p1)}$ of the drive flux, the control current $i_{S2}^{*(T,p2)}$ in the $p_2$-plane necessary for a desired transverse force F*, c) transforming said control current $i_{S2}^{*(T,p2)}$ by a coordinate rotation about a rotation angle $\rho^{(p2)}$ into a coordinate system (S) fixed to the stator, said rotation angle being defined by $\rho^{(p2)}=\rho_o^{(p2)}+\gamma_S^{(p1)}$ wherein $\rho_o^{(p2)}$ denotes a constant angle describing a given relative rotation between the control winding and the drive winding in the stator.

2. A method in accordance with claim 1, wherein the control current $i_{S2}^{*(T,p2)}$ in the coordinate system (T) is determined component-wise as a vector $$\underline{i_{S2}}^{*(T,p2)} = \begin{pmatrix} i_{S2d}^{*(T,p2)} \\ i_{S2q}^{*(T,p2)} \end{pmatrix}$$

in accordance with the relationships defined by $$i_{S2d}^{*(T,p2)} = \frac{F^*_x K_{Fy}\Psi_1 + F^*_y K_{Sx} L_2 i_{S1q}^{(F,p1)}}{K_{Fx}K_{Fy}\Psi_1^2 - K_{Sx}K_{Sy}L_2^2 (i_{S1q}^{(F,p1)})^2},$$

$$i_{S2q}^{*(T,p2)} = \frac{F^*_y K_{Fx}\Psi_1 + F^*_x K_{Sy} L_2 i_{S1q}^{(F,p1)}}{K_{Fx}K_{Fy}\Psi_1^2 - K_{Sx}K_{Sy}L_2^2 (i_{S1q}^{(F,p1)})^2}$$

where i) desired force vector $$\underline{F^*} = \begin{pmatrix} F^*_x \\ F^*_y \end{pmatrix},$$

ii) $i_{S1q}^{(F,p1)}$ is a torque-forming drive current component in flow coordinates in the $p_1$-plane, iii) $\psi_1$ is a magnitude of the drive flux, and iv) $L_2$, $K_{Fx}$, $K_{Fy}$, $K_{Sx}$, and $K_{Sy}$ are machine parameters.

3. A method in accordance with claim 2, wherein parameters corresponding to magnitude $\psi_1$ of the drive flux, argument $\gamma_S^{(p1)}$ of the drive flux and the torque-forming drive current $i_{S1q}^{(p1)}$ are computed with the aid of machine equations from measurement parameters and from observed parameters and corresponding desired values.

4. A method in accordance with claim 2, wherein parameters corresponding to magnitude $\psi_1$ of the drive flux, argument $\gamma_S^{(p1)}$ of the drive flux and the torque-forming drive current $i_{S1q}^{(p1)}$ are computed with the aid of machine equations from either measurement parameters or from observed parameters or from corresponding desired values.

5. A method in accordance with claim 1, wherein the control current $i_{S2}^{*(T,p2)}$ is determined component-wise in the coordinate system (T) as the vector $$\underline{i}_{S2}^{*(T,p2)} = \begin{pmatrix} i_{S2d}^{*(T,p2)} \\ i_{S2q}^{*(T,p2)} \end{pmatrix}$$

in accordance with the simplified relationships defined by $$i_{S2d}^{*(T,p2)} = \frac{F^*_x}{K_{Fx}\Psi_1}, \quad i_{S2q}^{*(T,p2)} = \frac{F^*_y}{K_{Fy}\Psi_1}$$

where i) desired force vector $$\underline{F}^* = \begin{pmatrix} F^*_x \\ F^*_y \end{pmatrix},$$

ii) $\psi_1$ is a magnitude of the drive flux, and iii) $K_{Fx}$ and $K_{Fy}$ are machine parameters.

6. A method in accordance with claim 1, wherein a transverse force vector regulation is superimposed on a transverse force vector control of the AC-machine, with the actual value of the transverse force vector being directly measured by force sensors or determined from other measurement parameters via a means for parameter identification, and subsequently being compared with a desired value to obtain a control deviation, the control deviation being supplied to a regulator and the regulator output being connected to the control input of the AC-machine for the transverse force control.

7. A method in accordance with claim 1, wherein a regulation of rotor position is superimposed on a transverse force vector control of the AC-machine with an actual value of the position (in the x-direction and in the y-direction) being directly measured by distance sensors or being determined from other measured parameters via a means for parameter identification, and subsequently being compared with a desired value (in the x-direction and in the y-direction) to obtain a control deviation, with the control deviation (in the x-direction and in the y-direction) being supplied to a regulator and with an output of the regulator being connected to a control input of the AC-machine for the transverse force control.

8. A method in accordance with claim 1, wherein, with the aid of transverse force vector control, forces are exerted on the rotor via which the bending deflection of the rotor is statically influenced.

9. A method in accordance with claim 1, wherein, with the aid of transverse force vector control, forces are exerted on the rotor via which eigen or self oscillations of the rotor are passively and/or actively damped, excited or influenced in some other manner.

10. A method in accordance with claim 1, wherein, with the aid of transverse force vector control, forces are exerted on the rotor via which the bending deflection of the rotor is dynamically influenced.

11. A method in accordance with claim 10, wherein the bending deflection of the rotor is also dynamically influenced.

12. A method in accordance with claim 1 wherein parameters corresponding to magnitude $\psi_1$ of the drive flux and argument $\gamma_S^{(p1)}$ of the drive flux are determined by flux measurement.

13. A method in accordance with claim 1 wherein parameters corresponding to magnitude $\psi_1$ of the drive flux and argument $\gamma_S^{(p1)}$ of the drive flux are determined by partial flux measurement.

14. Apparatus for controlling an AC-machine, the AC-machine having a rotor and a stator that includes a stator winding for combined generation of a torque and a transverse force F which acts perpendicular to the rotor and whose magnitude and direction can be adjusted as desired, the stator winding including a drive winding with a pole pair number $p_1$ and a control winding with a pole pair number $p_2$ that is defined by $p_2 = p_1 \pm 1$, wherein the drive winding of the stator winding is supplied with a drive current $i_{S1}$ for generating a drive flux which can be represented in an electrical $p_1$-plane by its magnitude and its argument, the $p_1$-plane being associated with the pole pair number $p_1$ of the drive winding, and the control winding of the stator winding is supplied with a control current $i_{S2}$ independently of the drive current $i_{S1}$, which control current $i_{S2}$ generates a control flux which can be represented in an electrical $p_2$-plane by its magnitude and its argument, the $p_2$-plane being associated with the pole pair number $p_2$ of the control winding, the apparatus comprising:

a) a current supply module for supplying a control winding, and a supply module for supplying a drive winding, b) a signal processing module in which
   i) parameters $\gamma_S^{(p1)}$, defined as an argument of the drive flux in the $p_1$-plane, $4_1$, defined as the magnitude of the drive flux, are determined,
   ii) a desired value for the control current $i_{S2}^{*(T,p2)}$ is determined, and
   iii) the control current $i_{S2}^{*(T,p2)}$ serves as a desired value of the current supply module for the control winding.

15. Apparatus for controlling an AC-machine in accordance with claim 14 wherein the supply module of the drive winding includes a control apparatus via which the torque or the speed of rotation and also the drive flux of the machine can be adjusted as desired.

16. Apparatus for controlling an AC-machine in accordance with claim 15, wherein the control apparatus operates in accordance with a characteristic control method.

17. Apparatus for controlling an AC-machine in accordance with claim 15, wherein the control apparatus operates in accordance with a field oriented control method.

18. Apparatus for controlling an AC-machine in accordance with claim 14 comprising additional means for transverse force vector control which include:

a) force sensors or a status observer for determining an actual value of the transverse force, and b) a regulator for regulating the transverse force.

19. Apparatus for controlling an AC-machine in accordance with claim 14 comprising additional means for the transverse force vector regulation, which include:

a) position sensors or a status observer for determining the rotor position, and b) a regulator for regulating the rotor position.

20. Apparatus for controlling an AC machine in accordance with claim 14, comprising additional means for regulating bending deflection of the rotor, which include:
 a) position sensors or a status observer for determining the bending deflection of the rotor, and
 b) a regulator for regulating the bending deflection of the rotor.

21. Apparatus for controlling an AC-machine in accordance with claim 14, comprising additional means for damping self oscillations of the rotor, which include:
 a) sensors or a status observer for determining oscillations of the rotor, and
 b) a regulator for regulating out the rotor oscillations.

* * * * *